(12) United States Patent
Fellenstein et al.

(10) Patent No.: US 7,562,035 B2
(45) Date of Patent: Jul. 14, 2009

(54) AUTOMATING RESPONSES BY GRID PROVIDERS TO BID REQUESTS INDICATING CRITERIA FOR A GRID JOB

(75) Inventors: Craig William Fellenstein, Brookfield, CT (US); Rick Allen Hamilton, II, Charlottesville, VA (US); Joshy Joseph, Poughkeepsie, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 11/034,303

(22) Filed: Jan. 12, 2005

(65) Prior Publication Data

US 2006/0152756 A1  Jul. 13, 2006

(51) Int. Cl.
  G06Q 30/00 (2006.01)
  G06F 17/30 (2006.01)
(52) U.S. Cl. .............................. 705/26; 705/27; 705/37
(58) Field of Classification Search .................... 705/1, 705/26–27, 37
  See application file for complete search history.

(56) References Cited

U.S. PATENT DOCUMENTS

| 4,591,980 | A |   | 5/1986  | Huberman et al. ............ 712/16  |
| 5,325,525 | A |   | 6/1994  | Shan et al. .................. 718/104 |
| 5,392,430 | A |   | 2/1995  | Chen et al. |
| 5,630,156 | A |   | 5/1997  | Privat et al. .................... 712/14 |
| 5,729,472 | A |   | 3/1998  | Seiffert et al. |
| 5,905,975 | A | * | 5/1999  | Ausubel ....................... 705/37 |
| 5,931,911 | A |   | 8/1999  | Remy et al. .................. 709/223 |
| 5,978,583 | A |   | 11/1999 | Ekanadham et al. ........ 717/106 |
| 5,996,013 | A |   | 11/1999 | Delp et al. |

(Continued)

FOREIGN PATENT DOCUMENTS

EP   0790559 A   8/1997

(Continued)

OTHER PUBLICATIONS

"What's So Great About Grid?". Ivan Schneider. Wall Street & Technology. New York: Jul. 2004. p. 24, 4 pgs. [recoverd from Proquest on Sep. 12, 2008].*

(Continued)

*Primary Examiner*—Jeffrey A. Smith
*Assistant Examiner*—William J. Allen
(74) *Attorney, Agent, or Firm*—William H. Steinberg; Amy J. Pattillo

(57) ABSTRACT

A bid controller grid service of a grid provider receives a job request from a client for processing a job within a grid environment of the grid provider, wherein the job request specifies at least one criteria required for the grid provider to handle a particular grid job. The grid service determines whether the grid environment includes the hardware platform class, software platform class, and network bandwidth required by the job request. If the grid service determines that the grid environment includes a sufficient hardware platform class, software platform class, and network bandwidth, then a total required workload for the job request is calculated. Next, a total cost for the total required workload is estimated and the grid service automatically returns a bid response to the client system, where the bid response includes an identifier for the grid provider and the total cost for the job request.

6 Claims, 10 Drawing Sheets

```
AUTOMATED RFP RESPONSE 1100

RESPONDENT       [ IBM GRID  1102 ]
JOB NUMBER       [ 105-1  1104 ]
ESTIMATED RUNTIME [ 4.6 HOURS  1106 ]
ESTIMATED JOB COST [ $4600.00  1108 ]
QUOTE EXPIRATION [ 8/15/03 16:00  1110 ]

EXCEPTIONS:
LATENCYLIMIT = 1.2
LATENCYACTUAL = 1.4            1112

COMMENTS:
SUBMISSION OF MULTIPLE JOBS GENERALLY  1114
RESULTS IN OVER ALL LOWER PRICING PER JOB
```

U.S. PATENT DOCUMENTS

| | | | | |
|---|---|---|---|---|
| 6,067,580 | A | 5/2000 | Aman | 719/33 |
| 6,397,197 | B1 | 5/2002 | Gindlesperger | 705/37 |
| 6,438,704 | B1 | 8/2002 | Harris et al. | 713/502 |
| 6,453,376 | B1 | 9/2002 | Fairman et al. | 710/240 |
| 6,647,373 | B1 | 11/2003 | Carlton-Foss | |
| 6,671,676 | B1 | 12/2003 | Shacham | 705/37 |
| 6,681,251 | B1 | 1/2004 | Leymann et al. | 709/226 |
| 6,738,736 | B1* | 5/2004 | Bond | 703/2 |
| 6,748,416 | B2 | 6/2004 | Carpenter et al. | 709/202 |
| 2002/0057684 | A1 | 5/2002 | Miyamoto et al. | 370/386 |
| 2002/0165979 | A1 | 11/2002 | Vincent | 709/239 |
| 2003/0023499 | A1* | 1/2003 | Das et al. | 705/26 |
| 2003/0036886 | A1 | 2/2003 | Stone | |
| 2003/0112809 | A1 | 6/2003 | Bharali et al. | 370/400 |
| 2003/0115099 | A1 | 6/2003 | Burns et al. | 705/14 |
| 2003/0145084 | A1 | 7/2003 | McNerney | 709/224 |
| 2003/0204485 | A1 | 10/2003 | Triggs | 707/1 |
| 2004/0078471 | A1 | 4/2004 | Yang | 709/227 |
| 2004/0193461 | A1 | 9/2004 | Keohane et al. | |
| 2007/0022425 | A1* | 1/2007 | Jackson | 718/104 |

FOREIGN PATENT DOCUMENTS

| | | |
|---|---|---|
| EP | 1267552 A | 12/2002 |
| WO | WO 03067494 A1 | 8/2003 |

OTHER PUBLICATIONS

"SGI and Platform Computing Announce Global Alliance for Grid Computing Solutions". PR Newswire. New York: Jul. 16, 2002. p. 1. [recovered from Proquest on Sep. 12, 2008].*

Foster et al.; The Anatomy of the Grid, Enabling Scalable Virtual Organizations; available at www.globus.org/research/papers/anatomy.pdf as of Nov. 27, 2003.

Foster et al.; The Physiology of the Grid, An Open Grid Services Architecture for Distributed Systems Integration; available at www.globus/org/research/papers/ogsa.pdf as of Nov. 27, 2003.

Foster, Ian; What is the Grid? A Three Point Checklist; available at www-fp.mcs.anl.gov/~foster/Articles/WhatIsTheGrid.pdf as of Nov. 27, 2003.

Ferreira et al.; IBM Redpaper—Globus Toolkit 3.0 Quick Start; available at www.redbooks.ibm.com/redpapers/pdfs/redp369 as of Nov. 27, 2003.

IBM Grid Computing—What is Grid Computing; available at www-1.ibm.com/grid/about_grid/what_is.shtml as of Nov. 27, 2003.

Berstis, Viktors; IBM Redpaper—Fundamentals of Grid Computing; available at www.redbooks.ibm.com/redpapers/pdfs/redp3613.pdf as of Nov. 27, 2003.

Jacob, Bart; IBM Grid Computing—Grid Computing: What are the key components?; available at www-106.ibm.com/developerworks/grid/library/gr-overview/ as of Nov. 27, 2003.

Unger et al.; IBM Grid Computing—A Visual Tour of Open Grid Services Architecture; available at www-106.ibm.com/developerworks/grid/library/gr-visual/ as of Nov. 27, 2003.

Edited by Rajkumar Buyya; Grid Computing Info Centre: Frequently Asked Questions (FAQ); available at http://www.cs.mu.oz.au/~raj/GridInfoware/gridfaq.html as of Nov. 27, 2003.

U.S. Appl. No. 11/034,335, filed Jan. 12, 2005, Fellenstein et al.

U.S. Appl. No. 11/034,305, filed Jan. 12, 2005, Fellenstein et al.

Massie ML et al, "The Ganglia Distributed Monitoring System: Design, Implementation, and Experience" Parallel Computing Elsevier Netherlands, vol. 30, No. 7, Jul. 2004, pp. 817-840.

Fenglian XU et al, "Tools and Support for Deploying Applications on the Grid" Services Computing, 2004. Proceedings 2004 International Conference on Shanghai, China, Sep. 15-18, 2004, Piscataway, NJ, IEEE, pp. 281-287.

Ian Foster and Carl Kesselman, "Grid2—Blueprint for a New Computing Infrastructure" 2004, Elsevier, San Francisco, CA, chapter 20, Instrumentation and Monitoring, pp. 319-343.

Smallen S et al, "The Inca Test Harness and Reporting Framework" Supercomputing 2004. Proceedings of the ACM/IEEE SC2004 Conference Pittsburgh, PA, Nov. 2004, p. 1-10.

Allen G, et al, "The Cactus Worm: Experiments with Dynamic Resource Discovery and Allocation in a Grid Environment", International Journal of High Performance Computing Applications, Sage Science Press, Thousand Oaks, US, vol. 15, No. 4, 2001, pp. 345-358.

Hwa Min Lee, "A Fault Tolerance Service for QoS in Grid Computing", Lecture Notes in Computer Science, vol. 2659, Aug. 2003, pp. 286-296.

Tianyi Zang, et al, "The Design and Implementation of an OGSA-based grid information service" Web Services, 2004. Proceedings IEEE International Conference on San Diego CA, Piscataway, NJ, IEEE, Jul. 6, 2004, pp. 566-573.

Sample N, et al, "Scheduling Under Uncertainty: Planning for the Ubiquitous Grid", Coordination Models and Languages, 5th International Conference, Coordination 2002. Proceedings (Lecture Notes in Computer Science, vol. 2315) Springer-Varlag Berlin, Germany, 2002, pp. 300-316.

Gever DH, et al, "WWW-based high performance computing support of acoustic matched field processing", MTS/IEEE Oceans 2001. An Ocean Odessey. Conference Proceedings (IEEE Cat. No. 01CH37295) Marine Technology Soc. Washington, DC, vol. 4, 2001, pp. 2541-2548.

Chase, JS et al, "Dynamic Vitual Clusters in a Grid Site Manager", High Performance Distributed Computing 2003. Proceedings. 12th IEEE International Symposium, Jun. 22-24, 2003, Piscataway, NJ, USA, IEEE, pp. 90-100.

"Method of Providing On-Demand-Computing for Server Blades", IP.com Journal, IP.com Inc., West Henrietta, NY, US, Sep. 8, 2003, p. 1.

Kubicek, C, et al., "Dynamic Allocation of Servers to Jobs in a Grid Hosting Environment", BY Technology Journal, vol. 22, No. 3, Jul. 2004, pp. 251-260.

Yang, Kun, et al, "Network Engineering Towards Efficient Resource On-Demand in Grid Computing", Communication Technology Proceedings, 2003, ICCT 2003, International Conference on Apr. 9-11, 2003, Piscataway, NJ, USA, IEEE, vol. 2, Apr. 9, 2003, pp. 1715-1718.

* cited by examiner

| RFP ENTRY INTERFACE 800 | |
|---|---|
| 802 — JOB NAME | DB_UPDATE_BASE |
| 806 — QOS OR SLA DOCUMENT NAME | NONE |
| 808 — JOB COST LIMIT | $5000.00 |
| 810 — CUOD ELIGIBLE | NO |
| 812 — PERFORMANCE REQUIRED | 6 HOURS OR LESS |
| 814 — LATENCY REQUIRED | NONE |
| 816 — DATA TRANSPORT | WEBFTP |
| 818 — COMPLETION CRITERIA | EXECUTION OF ALL DB INSERTS |
| 820 — SECURITY REQUIREMENTS | SECURE DATA CHANNEL |
| 822 — RESOURCE LIMITS | NONE |
| 804 — JOB NUMBER | 105 |
| 824 — JOB PRIORITY | 1 |
| 826 — GRID ALLIANCE | NONE |
| 828 — JOB TIME LIMIT | 6 HOURS |
| 830 — HARDWARE CLASS | 5 |
| 832 — SOFTWARE CLASS | 7 |
| 834 — SELL OFF PERMITTED | NO |
| 836 — DATA SIZE | 42000 |
| 838 — ESTIMATED RUNTIME | 4 HOURS |
| 840 — RFP RESPONSE TIME | 2 HOURS OR LESS |
| 842 — SAMPLE JOB | MICROCOSM A |

RFP 850

SAVE 844

*Fig. 8*

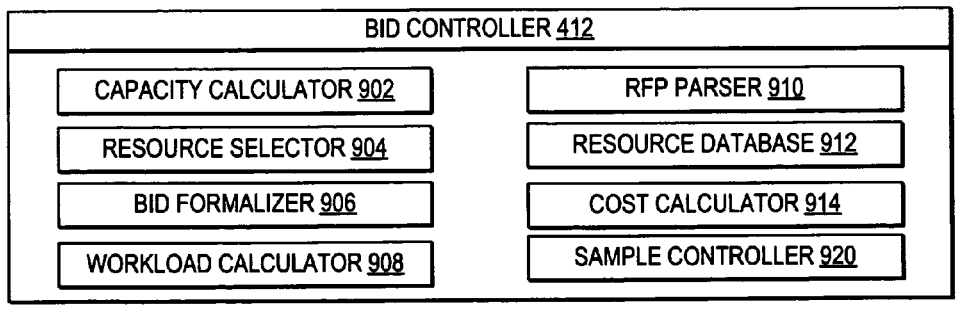

*Fig. 9*

| AUTOMATED RFP RESPONSE 1100 | |
|---|---|
| RESPONDENT | IBM GRID 1102 |
| JOB NUMBER | 105 -1 1104 |
| ESTIMATED RUNTIME | 4.6 HOURS 1106 |
| ESTIMATED JOB COST | $4600.00 1108 |
| QUOTE EXPIRATION | 8/15/03 16:00 1110 |

EXCEPTIONS:

LATENCYLIMIT = 1.2
LATENCYACTUAL = 1.4                         1112

COMMENTS:

SUBMISSION OF MULTIPLE JOBS GENERALLY   1114
RESULTS IN OVER ALL LOWER PRICING PER JOB

*Fig. 11*

AUTOMATING RESPONSES BY GRID PROVIDERS TO BID REQUESTS INDICATING CRITERIA FOR A GRID JOB

CROSS-REFERENCE TO RELATED APPLICATIONS

The present application is related to the following applications, hereby incorporated herein by reference:

(1) U.S. patent application Ser. No. 11/034,305, filed Jan. 12, 2005; and (2) U.S. patent application Ser. No. 11/034,335, filed Jan. 12, 2005.

BACKGROUND OF THE INVENTION

1. Technical Field

The present invention relates in general to improved grid computing and in particular to automated bidding for virtual job requests within a grid environment. Still more particularly, the present invention relates to responding to virtual grid job requests for grid resources by calculating the capacity and cost of grid resources to handle the workload requirements for the virtual requests, where a bid for handling the virtual job request can be generated based on the capacity and cost of the grid environment to handle the workload requirements.

2. Description of the Related Art

Ever since the first connection was made between two computer systems, new ways of transferring data, resources, and other information between two computer systems via a connection continue to develop. In typical network architectures, when two computer systems are exchanging data via a connection, one of the computer systems is considered a client sending requests and the other is considered a server processing the requests and returning results. In an effort to increase the speed at which requests are handled, server systems continue to expand in size and speed. Further, in an effort to handle peak periods when multiple requests are arriving every second, server systems are often joined together as a group and requests are distributed among the grouped servers. Multiple methods of grouping servers have developed such as clustering, multi-system shared data (sysplex) environments, and enterprise systems. With a cluster of servers, one server is typically designated to manage distribution of incoming requests and outgoing responses. The other servers typically operate in parallel to handle the distributed requests from clients. Thus, one of multiple servers in a cluster may service a client request without the client detecting that a cluster of servers is processing the request.

Typically, servers or groups of servers operate on a particular network platform, such as Unix or some variation of Unix, and provide a hosting environment for running applications. Each network platform may provide functions ranging from database integration, clustering services, and security to workload management and problem determination. Each network platform typically offers different implementations, semantic behaviors, and application programming interfaces (APIs).

Merely grouping servers together to expand processing power, however, is a limited method of improving efficiency of response times in a network. Thus, increasingly, within a company network, rather than just grouping servers, servers and groups of server systems are organized as distributed resources. There is an increased effort to collaborate, share data, share cycles, and improve other modes of interaction among servers within a company network and outside the company network. Further, there is an increased effort to outsource nonessential elements from one company network to that of a service provider network. Moreover, there is a movement to coordinate resource sharing between resources that are not subject to the same management system, but still address issues of security, policy, payment, and membership. For example, resources on an individual's desktop are not typically subject to the same management system as resources of a company server cluster. Even different administrative groups within a company network may implement distinct management systems.

The problems with decentralizing the resources available from servers and other computing systems operating on different network platforms, located in different regions, with different security protocols and each controlled by a different management system, has led to the development of Grid technologies using open standards for operating a grid environment. Grid environments support the sharing and coordinated use of diverse resources in dynamic, distributed, virtual organizations. A virtual organization is created within a grid environment when a selection of resources, from geographically distributed systems operated by different organizations with differing policies and management systems, is organized to handle a job request.

One important application of a grid environment is that companies implementing an enterprise computing environment can access external grid computing "farms". Sending jobs to a grid computing farms is one way to outsource job execution. The grid computing farms may include groups of grid resources accessible for executing grid jobs received from multiple customers.

A limitation of current grid computing farms is that the process for attaining bids from multiple grid computing farms is time consuming and inefficient. In particular, a customer needing to send jobs to a grid computing farm will typically want the least costly grid computing farm from among multiple available grid farm providers to process the grid jobs. However, to determine the most competitive bid from among the multiple available grid farm providers, a customer must contact a representative of each grid computing farm, provide a description of the type of grid resources needed and receive a bid from the representative of each grid farm. Requiring a customer to contact a representative of each grid computing farm and go through a bidding process is inefficient for the customer and for the grid computing farm vendor.

Therefore, in view of the foregoing, it would be advantageous to provide a method, system, and program for receiving virtual grid job requests and automatically calculating a bid for performing the grid job, such that the consumer and the grid resource vendor can more efficiently determine whether a particular grid environment is able to handle a virtual grid job request and provide on the spot prices for use of a grid environment. In particular, it would be advantageous to provide a method, system, and program for calculating the workload associated with a virtual grid job request so that an accurate determination of the ability of the grid environment to handle a virtual grid job request is quickly determines and a price can be calculated based on the estimated workload of the virtual grid job request.

SUMMARY OF THE INVENTION

In view of the foregoing, the invention in general provides for automated grid computing and for automated bidding for virtual job requests within a grid environment. The invention relates to responding to virtual grid job requests for grid resources by calculating the capacity and cost of grid resources to handle the workload requirements for the virtual requests, where a bid for handling the virtual job request is generated based on the capacity and cost of the grid environment to handle the workload requirements.

A bid controller grid service of a grid provider receives a job request from a client for processing a job within a grid environment of the grid provider, wherein the job request specifies at a least one criteria required for the grid provider to handle a particular grid job. The grid service determines whether the grid environment includes the hardware platform class, software platform class, and network bandwidth required by the job request. If the grid service determines that the grid environment includes a sufficient hardware platform class, software platform class, and network bandwidth, then a total required workload for the job request is calculated. Next, a total cost for the total required workload is estimated and the grid service automatically returns a bid response to the client system, where the bid response includes an identifier for the grid provider and the total cost for the job request.

When calculating a total required workload for the job request, the grid service only includes on demand resources and external grid provider resources in the calculation of the total required workload if allowed by the job request. In addition, the job request limits the total resources available for a particular grid job.

In addition, calculating a total required workload includes first calculating a total time available for executing the job within the grid environment, accessing data required for the job, and returning a result of the job from the grid environment, based on the job request. Next, calculating the total required workload includes calculating a total resource requirement from among at least a hardware resource, a software resource, and a network resource. Finally, the grid service determines a selection of available resources from among the total available resources enabling the grid provider to process the particular grid job in the total time available and with the total resource requirement met.

The bid response is minimized to only include the unique response information for the grid provider. In particular, the bid response includes exceptions to the criteria in the job request, where the exception alerts the client to a bid criteria that may be renegotiated. In addition, the bid response includes comments that suggest potential adjustments to the job request to facilitate a lower cost according to the pricing constrains for the gird provider.

BRIEF DESCRIPTION OF THE DRAWINGS

The novel features believed aspect of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is a block diagram depicting a user interface for entry of RFP criteria for a grid job;

FIG. 9 is a block diagram depicting one embodiment of a bid controller for a grid provider;

FIG. 11 is a block diagram illustrating an RFP response generated by a grid provider in response to an RFP;

DETAILED DESCRIPTION OF THE PREFERRED EMBODIMENT

Figure 1:
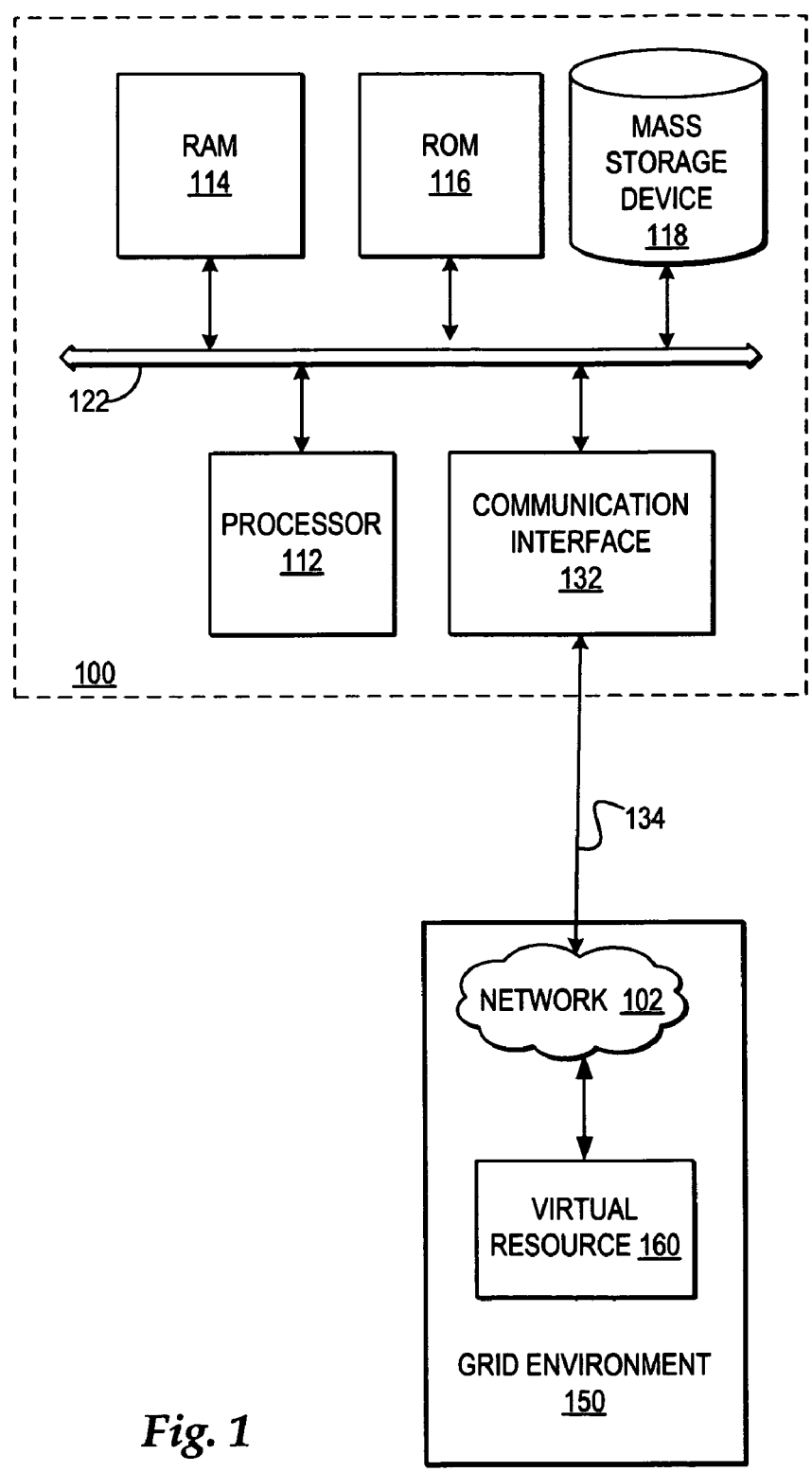
FIG. 1 depicts one embodiment of a computer system which may be implemented in a grid environment and in which the present invention may be implemented.

Referring now to the drawings and in particular to FIG. 1, there is depicted one embodiment of a computer system which may be implemented in a grid environment and in which the present invention may be implemented. As will be further described, the grid environment includes multiple computer systems managed to provide resources. Additionally, as will be further described, the present invention may be executed in a variety of computer systems, including a variety of computing systems, mobile systems, and electronic devices operating under a number of different operating systems managed within a grid environment.

In one embodiment, computer system 100 includes a bus 122 or other device for communicating information within computer system 100, and at least one processing device such as processor 112, coupled to bus 122 for processing information. Bus 122 may include low-latency and higher latency paths connected by bridges and adapters and controlled within computer system 100 by multiple bus controllers. When implemented as a server system, computer system 100 typically includes multiple processors designed to improve network servicing power.

Processor 112 may be a general-purpose processor such as IBM's PowerPC™ processor that, during normal operation, processes data under the control of operating system and application software accessible from a dynamic storage device such as random access memory (RAM) 114 and a static storage device such as Read Only Memory (ROM) 116. The operating system may provide a graphical user interface (GUI) to the user. In one embodiment, application software contains machine executable instructions that when executed on processor 112 carry out the operations depicted in the flowcharts of FIGS. 12, 13, 14 and other operations described herein. Alternatively, the steps of the present invention might be performed by specific hardware components that contain hardwired logic for performing the steps, or by any combination of programmed computer components and custom hardware components.

The present invention may be provided as a computer program product, included on a machine-readable medium having stored thereon the machine executable instructions used to program computer system 100 to perform a process according to the present invention. The term "machine-readable medium" as used herein includes any medium that participates in providing instructions to processor 112 or other components of computer system 100 for execution. Such a medium may take many forms including, but not limited to, non-volatile media, volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium from which computer system 100 can read and which is suitable for storing instructions. In the present embodiment, an example of a non-volatile medium is mass storage device 118 which as depicted is an internal component of computer system 100, but will be understood to also be provided by an external device. Volatile media include dynamic memory such as RAM 114. Transmission media include coaxial cables, copper wire or fiber optics, including the wires that comprise bus 122. Transmission media can also take the form of acoustic or light waves, such as those generated during radio frequency or infrared data communications.

Moreover, the present invention may be downloaded as a computer program product, wherein the program instructions may be transferred from a remote virtual resource, such as a virtual resource 160, to requesting computer system 100 by way of data signals embodied in a carrier wave or other propagation medium via a network link 134 (e.g. a modem or network connection) to a communications interface 132 coupled to bus 122. Virtual resource 160 may include a virtual representation of the resources accessible from a single system or systems, wherein multiple systems may each be considered discrete sets of resources operating on independent platforms, but coordinated as a virtual resource by a grid manager. Communications interface 132 provides a two-way data communications coupling to network link 134 that may be connected, for example, to a local area network (LAN), wide area network (WAN), or an Internet Service Provider (ISP) that provide access to network 102. In particular, network link 134 may provide wired and/or wireless network communications to one or more networks, such as network 102, through which use of virtual resources, such as virtual resource 160, is accessible as provided by a grid management system 150. Grid management system 150 may be part of multiple types of networks, including a peer-to-peer network, or may be part of a single computer system, such as computer system 100.

As one example, network 102 may refer to the worldwide collection of networks and gateways that use a particular protocol, such as Transmission Control Protocol (TCP) and Internet Protocol (IP), to communicate with one another. Network 102 uses electrical, electromagnetic, or optical signals that carry digital data streams. The signals through the various networks and the signals on network link 134 and through communication interface 132, which carry the digital data to and from computer system 100, are exemplary forms of carrier waves transporting the information. It will be understood that alternate types of networks, combinations of networks, and infrastructures of networks may be implemented.

When implemented as a server system, computer system 100 typically includes multiple communication interfaces accessible via multiple peripheral component interconnect (PCI) bus bridges connected to an input/output controller. In this manner, computer system 100 allows connections to multiple network computers.

Additionally, although not depicted, multiple peripheral components and internal/external devices may be added to computer system 100, connected to multiple controllers, adapters, and expansion slots coupled to one of the multiple levels of bus 122. For example, a display device, audio device, keyboard, or cursor control device may be added as a peripheral component.

Those of ordinary skill in the art will appreciate that the hardware depicted in FIG. 1 may vary. Furthermore, those of ordinary skill in the art will appreciate that the depicted example is not meant to imply architectural limitations with respect to the present invention.

Figure 2:
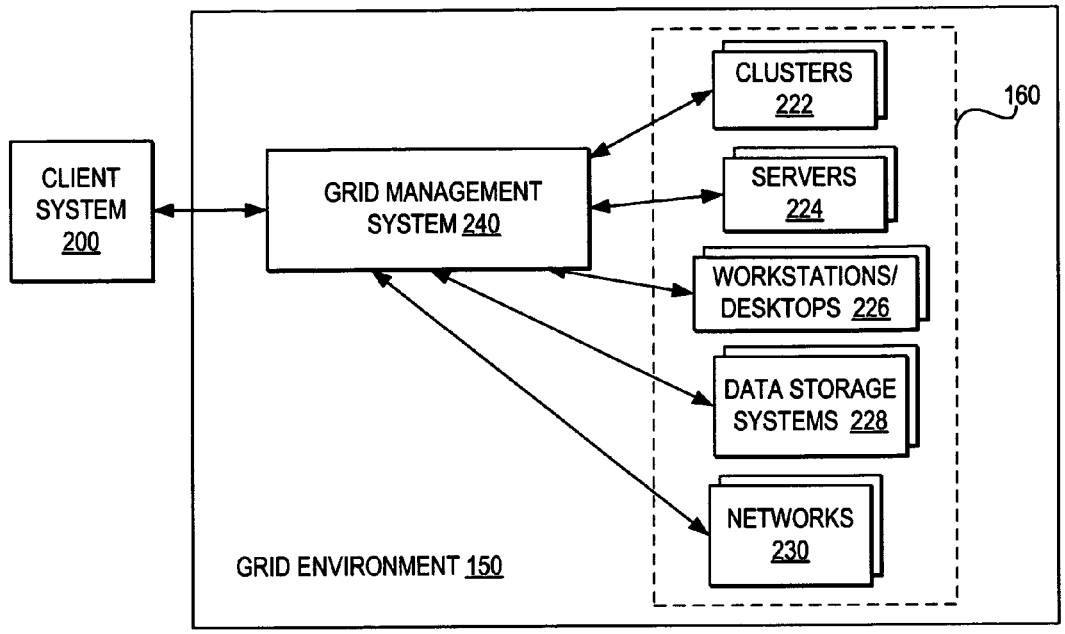
FIG. 2 is block diagram illustrating one embodiment of the general types of components within a grid environment.

With reference now to FIG. 2, a block diagram illustrates one embodiment of the general types of components within a grid environment. In the present example, the components of a grid environment 240 include a client system 200 interfacing with a grid management system 150 which interfaces with server clusters 222, servers 224, workstations and desktops 226, data storage systems 228, and networks 230. For purposes of illustration, the network locations and types of networks connecting the components within grid environment 240 are not depicted. It will be understood, however, that the components within grid environment 240 may reside atop a network infrastructure architecture that may be implemented with multiple types of networks overlapping one another. Network infrastructure may range from multiple large enterprise systems to a peer-to-peer system to a single computer system. Further, it will be understood that the components within grid environment 240 are merely representations of the types of components within a grid environment. A grid environment may simply be encompassed in a single computer system or may encompass multiple enterprises of systems. In addition, it will be understood that grid environment 240 may be provided by a grid provider, where a cost for use of resources within grid environment 240 may be calculated based on the amount of time required for a grid job to execute or the actual amount of resources used, among examples of calculation basis.

The central goal of a grid environment, such as grid environment 240 is organization and delivery of resources from multiple discrete systems viewed as virtual resource 160. Client system 200, server clusters 222, servers 224, workstations and desktops 226, data storage systems 228, networks 230 and the systems creating grid management system 150 may be heterogeneous and regionally distributed with independent management systems, but enabled to exchange information, resources, and services through a grid infrastructure enabled by grid management system 150. Further, server clusters 222, servers 224, workstations and desktops 226, data storage systems 228, and networks 230 may be geographically distributed across countries and continents or locally accessible to one another.

In the example, client system 200 interfaces with grid management system 150. Client system 200 may represent any computing system sending requests to grid management system 150. In particular, client system 200 may send virtual job requests and jobs to grid management system 150. In particular, virtual job requests may be sent in the form of requests for proposal (RFPs), as will be further described.

Further, while in the present embodiment client system 200 is depicted as accessing grid environment 240 with a request, in alternate embodiments client system 200 may also operate within grid environment 240. Additionally, when client system 200 submits virtual job requests and jobs to grid management system 150, client system 200 may be referred to as a grid client.

While the systems within virtual resource 160 are depicted in parallel, in reality, the systems may be part of a hierarchy of systems where some systems within virtual resource 160 may be local to client system 200, while other systems require access to external networks. Additionally, it is important to note, that systems depicted within virtual resources 160 maybe physically encompassed within client system 200.

One function of grid management system 150 is to manage virtual job requests and jobs from client system 200 and control distribution of each job to a selection of computing systems of virtual resource 160 for use of particular resources at the available computing systems within virtual resource 160. From the perspective of client system 200, however, virtual resource 160 handles the request and returns the result without differentiating between which computing system in virtual resource 160 actually performed the request.

To implement grid environment 240, grid management system 150 facilitates grid services. Grid services may be designed according to multiple architectures, including, but not limited to, the Open Grid Services Architecture (OGSA). In particular, grid management system 150 refers to the management environment which creates a grid by linking computing systems into a heterogeneous network environment characterized by sharing of resources through grid services.

In one example, a grid service is invoked when grid management system 150 receives a virtual job request that with an RFP that specifies the parameters for processing a job. The grid service is a bid controller that determines a total workload required for the virtual job request and calculates a capacity of virtual resource 160 to handle the total workload required. The bid controller then calculates a cost for the virtual job request and returns a bid for performing the job specified by the virtual job request based on the capacity of grid environment 240 to handle the total workload required and the cost for use of that workload.

Figure 3:
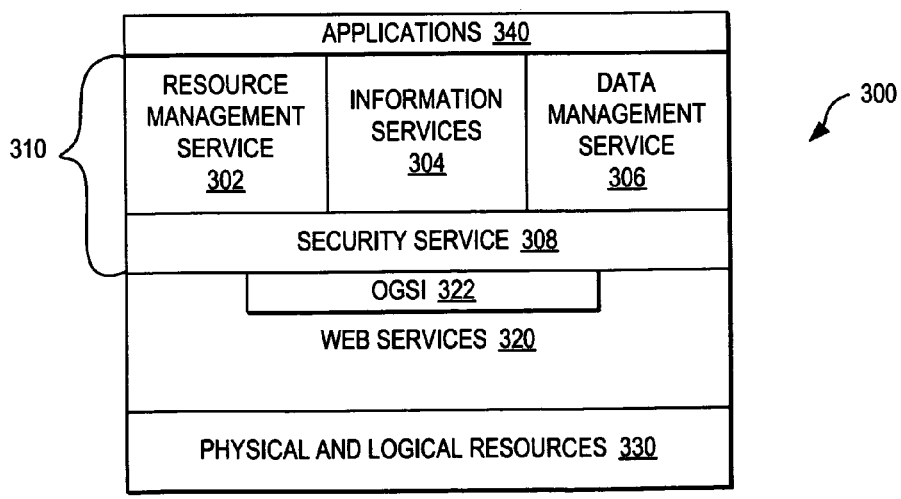
FIG. 3 is a block diagram depicting one example of an architecture that may be implemented in a grid environment.

Referring now to FIG. 3, a block diagram illustrates one example of an architecture that may be implemented in a grid environment. As depicted, an architecture 300 includes multiple layers of functionality. As will be further described, the present invention is a process which may be implemented in one or more layers of an architecture, such as architecture 300, which is implemented in a grid environment, such as the grid environment described in FIG. 2. It is important to note that architecture 300 is just one example of an architecture that may be implemented in a grid environment and in which the present invention may be implemented. Further, it is important to note that multiple architectures may be implemented within a grid environment.

Within the layers of architecture 300, first, a physical and logical resources layer 330 organizes the resources of the systems in the grid. Physical resources include, but are not limited to, servers, storage media, and networks. The logical resources virtualize and aggregate the physical layer into usable resources such as operating systems, processing power, memory, I/O processing, file systems, database managers, directories, memory managers, and other resources.

Next, a web services layer 320 provides an interface between grid services 310 and physical and logical resources 330. Web services layer 320 implements service interfaces including, but not limited to, Web Services Description Language (WSDL), Simple Object Access Protocol (SOAP), and extensible mark-up language (XML) executing atop an Internet Protocol (IP) or other network transport layer. Further, the Open Grid Services Infrastructure (OSGI) standard 322 builds on top of current web services 320 by extending web services 320 to provide capabilities for dynamic and manageable Web services required to model the resources of the grid. In particular, by implementing OGSI standard 322 with web services 320, grid services 310 designed using OGSA are interoperable. In alternate embodiments, other infrastructures or additional infrastructures may be implemented a top web services layer 320.

Grid services layer 310 includes multiple services which together perform the functions described with reference to grid management system 150. For example, grid services layer 310 may include grid services designed using OGSA, such that a uniform standard is implemented in creating grid services. Alternatively, grid services may be designed under multiple architectures. Grid services can be grouped into four main functions. It will be understood, however, that other functions may be performed by grid services.

First, a resource management service 302 manages the use of the physical and logical resources. Resources may include, but are not limited to, processing resources, memory resources, and storage resources. Management of these resources includes scheduling jobs, distributing jobs, and managing the retrieval of the results for jobs. Resource management service 302 monitors resource loads and distributes jobs to less busy parts of the grid to balance resource loads and absorb unexpected peaks of activity. In particular, a user may specify preferred performance levels so that resource management service 302 distributes jobs to maintain the preferred performance levels within the grid.

Second, information services 304 manage the information transfer and communication between computing systems within the grid. Since multiple communication protocols may be implemented, information services 304 manages communications across multiple networks utilizing multiple types of communication protocols.

Third, a data management service 306 manages data transfer and storage within the grid. In particular, data management service 306 may move data to nodes within the grid where a job requiring the data will execute. A particular type of transfer protocol, such as Grid File Transfer Protocol (GridFTP), may be implemented.

Finally, a security service 308 applies a security protocol for security at the connection layers of each of the systems operating within the grid. Security service 308 may implement security protocols, such as Open Secure Socket Layers (SSL), to provide secure transmissions. Further, security service 308 may provide a single sign-on mechanism, so that once a user is authenticated, a proxy certificate is created and used when performing actions within the grid for the user.

Multiple services may work together to provide several key functions of a grid computing system. In a first example, computational tasks are distributed within a grid. Data management service 306 may divide up a computation task into separate grid services requests of packets of data that are then distributed by and managed by resource management service 302. The results are collected and consolidated by data management system 306. In a second example, the storage resources across multiple computing systems in the grid are viewed as a single virtual data storage system managed by data management service 306 and monitored by resource management service 302.

An applications layer 340 includes applications that use one or more of the grid services available in grid services layer 310. Advantageously, applications interface with the physical and logical resources 330 via grid services layer 310 and web services 320, such that multiple heterogeneous systems can interact and interoperate.

Figure 4:
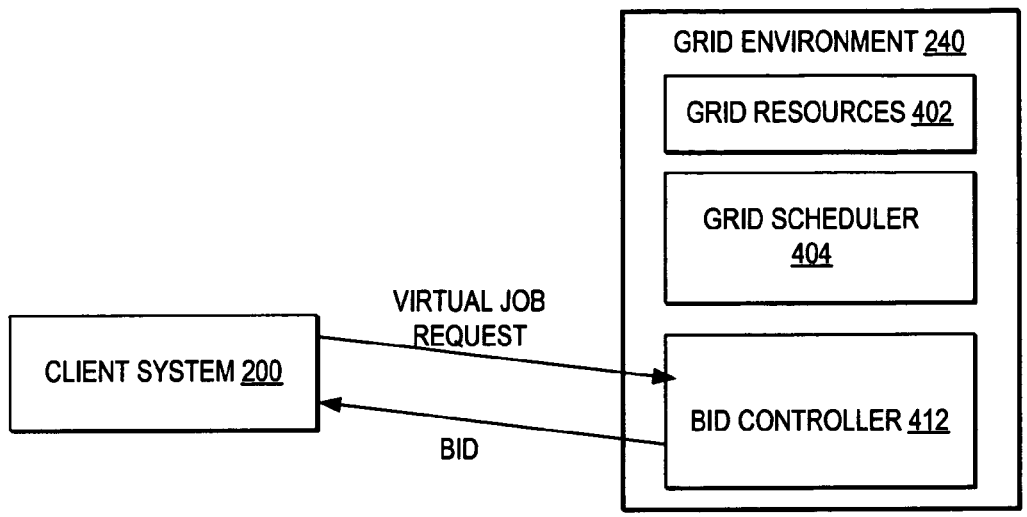
FIG. 4 is a block diagram depicting a grid environment in which virtual job requests are received and automatically replied to in the form of a bid.

With reference now to FIG. 4, there is depicted a block diagram of a grid environment in which virtual job requests are received and automatically replied to in the form of a bid in accordance with the method, system, and program of the present invention. As depicted, client system 200 sends virtual job requests to a grid environment 240. Grid environment 240 may logically include a grid scheduler 404, a bid controller 412, and grid resources 402. Grid resources 402 represent the available resources within grid environment 150 and a grid scheduler 404 controls distribution of jobs to grid resources 402. It will be understood that grid resources 402, grid scheduler 404, and bid controller 412 may execute among multiple server systems distributed within a single network or among multiple networks.

Bid controller 412, which handles receiving virtual jobs requests and generating bids for completion of the job specified by a virtual job request, may be called as a grid service within grid environment 240. Alternatively, virtual job requests may be passed to bid controller 412 from the transport layer or other gatekeeping function of grid environment 240. Further, bid controller 412 may execute within a system external to grid environment 240.

As will be further described with reference to FIG. 9, in one embodiment, bid controller 412 includes a workload calculator module 908. Workload calculator module 908 determines the likely workload required by each virtual job request and calculates the capacity of grid environment 240 to handle the required workload. Based on the capacity of grid environment 240 to handle the required workload, a cost calculator 914 calculates a cost for performing the job specified by the virtual job request. A bid formalizer 906 considers other factors required for the job and returns a bid response to client system 200. In addition, bid formalizer 906 stores the bid response in a bid response table, for access by grid scheduler 404 if client system 200 submits the actual job associated with the virtual job request to the grid provider represented by grid environment 240.

While in the embodiment depicted bid controller 412 is illustrated handling receipt of virtual job requests and automatic determination and return of bids for processing jobs within grid environment 150, it will be understood that bid controller 412 may handle receipt of virtual job requests from multiple grid clients and returns bids for processing jobs within multiple grid environments.

In one embodiment, grid environment 400 includes grid resources 402, which are the resource available to a particular grid provider for handling grid jobs. In addition, grid resources 402 may include resources which are accessible from other grid providers and which are capacity on demand (CUOD) resources.

It is important to note that while throughout the description, a grid provider refers to an entity that provides independent grid processing in a grid environment independent from client system 200, that client system 200 may submit grid jobs to a grid provider of a grid environment that includes client system 200. In addition, a grid provider may also be referred to as a grid vendor.

Figure 5:
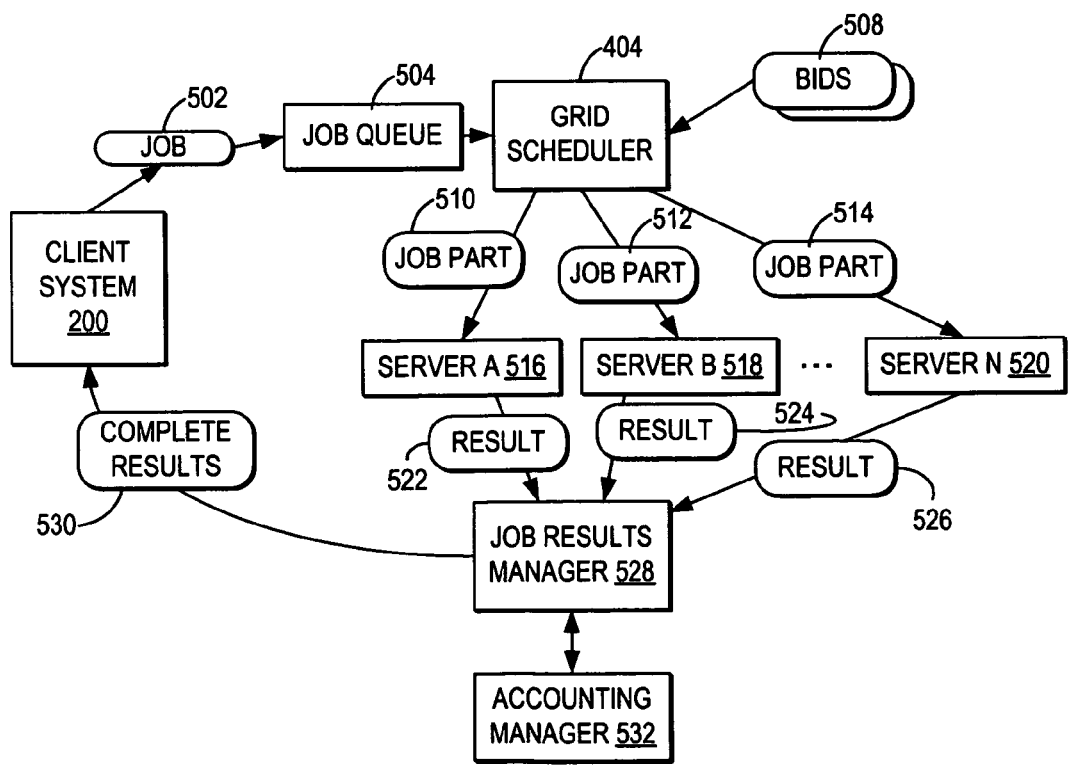
FIG. 5 is a flow diagram depicting a job submitting by a client system to a grid provider and the results of the job returned by the grid provider.

Referring now to FIG. 5, there is depicted a flow diagram of a job submitting by a client system to a grid provider and the results of the job returned by the grid provider. As illustrated, client system 200 submits job 502 to a grid provider. In particular, as previously described, each grid provider may implement a grid management system, such as grid management system 240, for managing the flow of a grid job by selecting grid resources for a job to meet a performance requirements, monitoring the progress of jobs and adjusting grid resources if needed to meet performance requirements, and managing the return of results to the client system.

In the example, the grid management system for a grid provider includes a job queue 504 that receives job 502 and holds job 502 until grid scheduler 404 can schedule and dispatch job 502 to grid resources. In particular, grid scheduler 404 accesses bid 508, which includes the performance requirements for job 502, based on a bid placed by the grid provider for the specific job or an agreement for job performance requirements for jobs received from a particular client system, for example. Grid scheduler 404 accesses the grid resources required to handle job 502, for example server A 516, server B 518, and server N 520. Although not depicted, grid scheduler 404 may access a grid manager and other components of the grid management system that build the required resources for a grid job, access resources from other grid environments, and sell-off grid jobs if necessary to other grid providers.

In the example, grid scheduler 404 divides job 502 into job parts 510, 512, and 514 that are distributed to server A 516, server B 518, and server N 520, respectively. A job results manager 528 collects results 522, 524, and 526 from server A 516, server B 518, and server N 520, respectively. Job results manager 528 returns complete results 530 to client system 200. In addition, job results manager 528 updates an accounting manager 532 when the job is complete. Accounting manager 532 communicates with a workload manager (not depicted) that monitors the use of server A 516, server B 518, and server N 520 by job 502 to calculate the total workload of job 502 and the total cost of job 502. In particular SLA 508 may specify factors that control the total cost of job 502, such as a maximum cost, a fixed cost, a sliding cost scale if performance requirements are not met, and other pricing adjustment factors.

Figure 6:
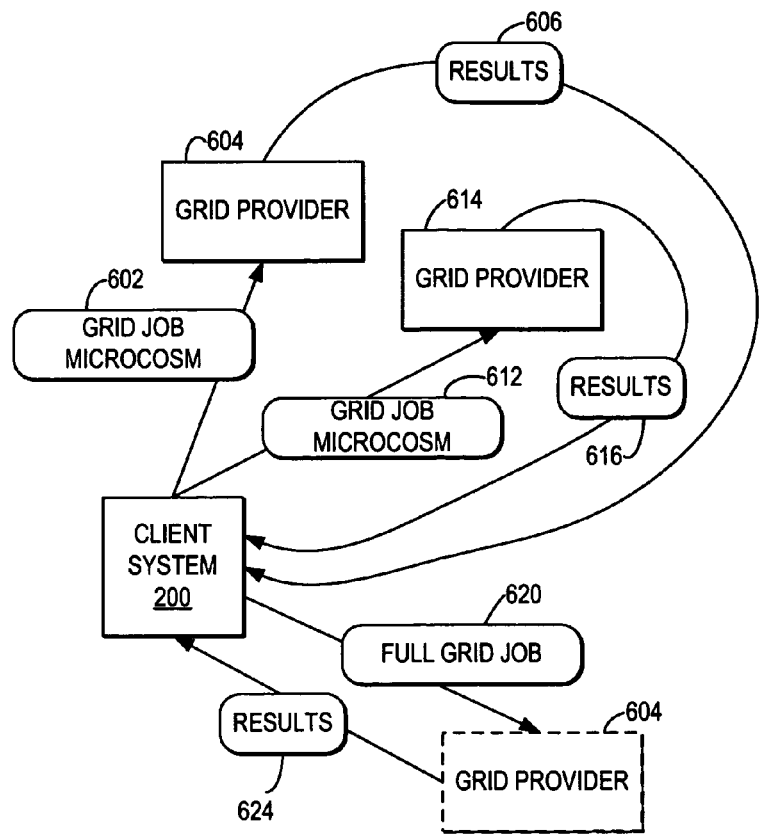
FIG. 6 is a flow diagram depicting a process for submitting a grid job microcosm to multiple grid providers to calculate a relative cost per client-defined application metric.

With reference now to FIG. 6, there is depicted a flow diagram of a process for submitting a grid job microcosm to multiple grid providers to calculate a relative cost per client-defined application metric. In the example, a client system 200 apportions a grid job into microcosms, which are small, representative jobs of the larger grid job that needs to be submitted to a grid provider. In the example, client system 200 submits grid job microcosm 602 and grid job microcosm 612 to grid providers 604 and 614, respectively. In one embodiment, client system 200 has already submitted a job request for the grid job microcosm to grid providers 604 and 614, as described with reference to FIG. 4, however, in an alternate embodiment, client system 200 may submit the grid job microcosms to grid providers 604 and 614 with pricing and performance expectations based on published rates or verbally agreed to rates, for example.

Each of grid providers 604 and 614 process gird job microcosms 602 and 612 and return results 606 and 616 the same manner as described with reference to a grid provider processing a grid job in FIG. 5. Client system 200 retrieves the results and costs for each of grid job microcosms 602 and 604 and calculates a translation value for each grid provider based on a client-defined application metric to grid provider metric ratio. For example, where a grid provider metric is an hourly charge, but a client-defined application metric is a number of database merges. Additional examples of calculating a translation value are further described with reference to U.S. patent application Ser. No. 11/034,305, filed Jan. 12, 2005, hereby incorporated herein by reference.

Then, client system 200 calculates an estimated cost for the full grid job according to the number of client-defined application metric operations required for the full grid job adjusted by the translation value, compares the costs estimated for each grid provider, and selects the most cost effective provider. According to an advantage, by sampling the actual performance and cost for each provider and translating the cost into a client-defined application metric basis, client system 200 can compare the actual cost for performance, rather than the promised cost for performance, on client-defined application metric basis, before sending a large grid job or multiple large grid jobs. In the example, after sampling the results and cost for each of grid job microcosms 602 and 612, client system 200 selects to send full grid job 620, of which grid job microcosm 602 and 612 are representative sets, to grid provider 604. Grid provider 604 processes full grid job 620, as described with reference to FIG. 5, and returns result 624 to client system 200.

Figure 7:
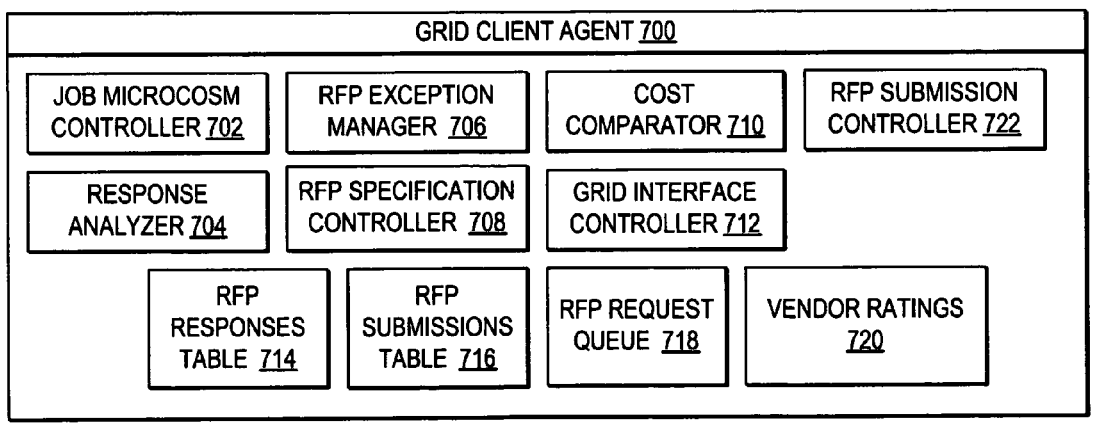
FIG. 7 is a block diagram depicting the components of a grid client agent for a client system for controlling automated bid requests to grid providers and automated analysis of bid responses from multiple grid providers.

Referring now to FIG. 7, a block diagram depicts the components of a grid client agent for a client system for controlling automated bid requests to grid providers and automated analysis of bid responses from multiple grid providers. As illustrated a grid client agent 700 executing at a client system 200 or at a server interfacing with multiple grid client systems, manages the formation of virtual job requests for grid jobs in the form of RFPs, distribution of RFPs to grid providers, analysis of bid responses to RFP's from grid providers, and distribution of grid jobs to a winning grid provider.

In particular, grid client agent 700 includes an RFP specification controller 708, which controls the interface for a user to enter the specifications for an RFP for a particular grid job. In one embodiment, RFP specification controller 708 is an independent controller. In another embodiment, RFP specification controller 708 is added to an existing scheduler for a grid client. As will be described with reference to FIG. 8, a user may enter multiple categories of criteria for a grid job. RFP specification controller 708 stores RFPs in an RFP request queue 718, scheduled for dispatch through a grid interface controller 712.

Grid interface controller 712 manages the distribution of RFPs, reception of bid responses, distribution of grid jobs, and reception of grid job results. In particular, RFPs submitted to grid providers through grid interface controller 712 are stored in RFP submissions table 716. Then, grid interface controller 712 manages the storages of bid responses in RFP response table 714.

In particular, grid client agent 700 includes an RFP submission controller 722 that determines when to submit RFPs in RFP request queue 718 to grid providers and selects the grid providers to which a particular RFP should be submitted by grid interface controller 712. In one embodiment, RFP submission controller 722 may select those grid vendors who are designated as part of a particular grid alliance, particularly when the RFP specifies a grid alliance vendor. In particular, vendor ratings 720 specifies the rating criteria for selecting grid providers and specifies the types of grid jobs included in grid alliance agreements.

In particular, in one example, a grid client or group of grid clients may agree to submit grid jobs with a particular set of characteristics to one or more grid providers as part of a grid alliance, where the grid client receives a discounted price for agreeing that a particular grid provider or group of grid providers will be the sole provider for grid jobs with the particular set of characteristics and vendor ratings 720 indicate the grid alliance and particular set of characteristics. In another example, a user may assign ratings to each grid vendor in vendor ratings 720 or grid client agent 700 may access grid vendor ratings from a vendor rating service.

In addition, grid client agent 700 includes a job microcosm controller 702 for controlling the formation of grid job microcosms for RFP submission controller 722 to submit to grid providers to sample the response times and costs for processing smaller portions of a grid job, as described with reference to FIG. 6. In one example, an RFP may include a grid job microcosm for a grid provider to run and return a bid and the results of running the grid job microcosm. In another example, a job microcosm controller 702 first requests the submission of RFPs for the grid job microcosm and then requests the submission of the grid job microcosms to multiple grid providers.

A cost comparator 710 determines the actual cost, from the client execution unit basis, for grid jobs based on the results from grid job microcosms and full grid jobs. In particular, as described with reference to FIG. 6, a ratio of a client-defined metric to a grid provider metric is calculated for a particular type of grid job based on the results of executing a grid job microcosm or full grid job. In one example, where one grid provider calculates a cost of a grid job based on an hourly charge and another calculates a cost of a grid job based on the number of floating point operations, cost comparator 710 calculates a ratio of each grid provider metric to a common client defined metric basis, such as a number of database merges.

A response analyzer 704 analyzes the responses received from grid providers and selects the winning grid provider. In one embodiment, response analyzer 704 analyzes the bid responses for whether the bid response meets all or particular RFP criteria and then compares those responses meeting the required criteria for a best price or other criteria. In another embodiment, where previous grid jobs of a same type have already been processed by a grid provider or where grid job microcosms were submitted, response analyzer 704 calls cost comparator 710 to first calculate the client-defined metric costs according to grid provider so that response analyzer 704 can compare actual estimated costs for performing a grid job with those promised by the grid providers to select the winning grid provider.

In addition, response analyzer 704 may trigger an RFP exception manager 706 if qualifying bid responses include exceptions or comments that suggest re-negotiation criteria for a grid job. In particular, RFP exception manager 706 may prompt a user to select to adjust an RFP according to the exceptions and comments returned in a bid response. Further, RFP exception manager 706 may automatically adjust an RFP with the exceptions or comments if they are allowed by re-negotiation preferences for the grid client.

During the re-negotiation process, RFP exception manager 706 may submit the adjusted RFP to a single grid provider that returned the exception or comment used to adjust the RFP or RFP exception manager 706 may submit the adjusted RFP to all of the original grid providers. In addition, during the re-negotiation process, RFP exception manager 706 may extend the original RFP response time to enable sufficient time for effective re-negotiation.

Referring now to FIG. 8, a block diagram depicts a user interface for entry of RFP criteria for a grid job. For purposes of example, the types of information that may be provided for each type of criteria are indicated. It will be understood that additional types of criteria may be included in an RFP, additional values may be specified for each criteria, and modules at each grid provider may respond to criteria in different ways.

As illustrated, a user interface 800 provides multiple entry fields for a user to enter requirements for a virtual job request to create an RFP 850. In the example depicted, user interface 800 is a window opened by RFP specification controller 708 responsive to a user request to submit the grid job to a grid provider. In another example, a client job scheduler may automatically trigger RFP specification controller 800 to open the window in user interface 800 when a job is detected that qualifies for grid submission. Upon a user selection of selectable button 844 through placement and selection of cursor 846, the entries in user interface 800 are stored and maintained for the grid job in an RFP request queue 718.

As illustrated at reference numeral 802, a job name may be designated for RFP 850. In the example, the job name is "DB_UPDATE_BASE" to identify a job requiring a database update. In addition to, or as an alternative to a job name, a job number, as indicated at reference numeral 804, or other identification may be specified by the user entering the RFP or specified automatically by RFP specification controller 708. As illustrated at reference numeral 804, a grid client may associate a unique number with each grid job to facilitate common reference to a particular grid job during the RFP negotiation process. In the example, a job number of "105" is associated with RFP 850. In addition, the grid provider matches the job number of the RFP and response with a grid job received by the grid provider from the grid client.

As illustrated at reference numeral 810, an eligibility for use of capacity on demand (CUOD) resources may be designated for RFP 850. In the example, the CUOD eligibility is set to "no". In one embodiment, CUOD resources are resources that are available, but currently not active. Both hardware and software resources can be available as capacity on demand resources. A licensing cost may be paid to activate on demand resources. If the client specifies that the grid job is not eligible for CUOD resources, then grid vendors will avoid including any available CUOD responses when preparing a response to the RFP. If the client specifies that a grid job is eligible for CUOD resources, then each grid vendor may prepare a bid response that includes the additional on demand resources and their cost if the resources are deemed necessary for the grid job. Further, in a bid response, the grid vendor may specify whether the job will require CUOD resources, such that costs for activation of these resources may be specified. Finally, in another example, when the grid client analyzes bid responses, the grid client may filter out those responses from grid providers that do not provide CUOD resources.

As illustrated at reference numeral 828, a job time limit for the grid job may be specified in RFP 850. In particular, a user may specify a time limit by which a job must be performed. When the workload calculation module determines the resources and cost of those resources, the time limit may be taken into consideration. For example, a job request to perform a particular job in 1 hour may cost more than a job request to perform the same job, but in 5 hours.

Another parameter of a job time limit may include the amount of time that a job should be submitted to a grid for a job that typically executes in a primary computing environment. In particular, most jobs can execute in a primary environment, suspend execution when the primary environment is busy, and then upon restart, recommence the job from where it left off. According to an advantage of the invention, a job may be suspended in its primary environment, moved to a grid environment and recommenced, and later suspended and returned to the primary environment. Thus, the job time limit may specify the amount of time that the job should execute on the grid environment before the job is suspended and returned to a primary environment for execution.

As illustrated at reference numeral 822, a resource limit for the resources allowed for a grid job may be specified in RFP 850. While some grid providers may charge a client by the time at job takes, other grid providers may charge a client by the resources used by the job. When billing by resource usage is implemented, clients may preferably specify the type and amount of resources the client is willing to pay for each job considered for submission.

As illustrated at reference numerals 812 and 818, the performance required time period and additional completion criteria may be specified in RFP 850. In the example, the performance of the grid job is required in six hours or less and no additional completion criteria are specified. Examples of additional completion criteria may include, however, that the job must complete execution within eight hours, that the job should be suspended after eight hours of execution time, that the job is complete when 10,000 output records have been generated, or the job is complete if executed twice and matching results are returned from each execution.

As illustrated at reference numeral 826, a grid alliance requirement for a grid job may be specified in RFP 850. In particular, a grid client may be in a strategic alliance with one or more grid providers, where a strategic alliance provides the client will solely use one of the grid providers in the alliance for grid jobs meeting certain criteria. A grid client may designate, in the RFP any required grid alliances. Alternatively, if the job is one meeting the criteria for an alliance that the client has agreed to, then RFP specification controller 708 may automatically fill in the grid alliance requirement in RFP 850 and the client may be limited to submitting the RFP to grid alliance providers.

In one example of a grid alliance, grid providers A and B may agree to be the sole sources for a client, where the submission of ten or more jobs to grid providers A and B entitles the client to a discounted pricing scheme. When an application at the grid client spawns ten or more jobs, then the RFP submission for those ten or more jobs is limited to only grid providers A and B.

As illustrated at reference numeral 808, a job cost limit for a grid job may be specified in RFP 850. For example, a user specifies a job cost limit of $5000.00 in RFP 850. In particular, job cost limits may include a monetary cost, a formula, or multiple conditioned costs.

As illustrated at reference numeral 832, a software platform class specification may be included in RFP 850. In particular, a grid job may or may not require specific software to execute. Where a grid job does require specific software to execute, the software platform class or specific software name is included in the RFP, as illustrated at reference numeral 832. In one example, each software platform class may be assigned a standard reference name or number.

For example, a particular software platform class may be assigned as reference number "7".

In one example, a grid job is attempting to resolve a mathematics problem, where any software with necessary calculation capabilities could be used and therefore no software platform class designation is necessary. In another example, however, a grid job is a complex parallel database query that is written and optimized for a specific software environment, where the RFP for the grid job specifies the specific software environment in the software platform class designator.

As illustrated at reference numeral 830, a hardware platform class specification may be included in RFP 850. In particular, a grid job may or may not require a specific hardware platform to execute. Where a grid job does require a specific hardware platform to execute, the specific hardware platform class or specific hardware platform name is included in the RFP, as illustrated at reference numeral 830. In one example, each hardware platform class may be assigned a standard reference name or number. For example, a particular hardware platform class may be assigned as reference number "5".

In one example, a grid job is attempting to resolve a mathematical problem, where any hardware platform that supports software containing calculation capabilities could be used and therefore no hardware platform class designation is necessary. In another example, however, a grid job is a complex parallel database query that is written and optimized for a specific hardware environment. For example, a complex database query may be optimized for DB2EEE with a particular problem reporting and resolution scheme "APAR1Y77222" applied and executing on ten IBM Power4 processor partitions, therefore the RFP would specify the software platform class of "DB2EEE with APAR 1Y77222" and the hardware platform class of "10 IBM Power4 processor partitions" or reference numerals representing these software and hardware platform classes.

As illustrated at reference numeral 816, a data access and transport mechanism may be specified for a grid job in RFP 850. In particular, many grid jobs will require data which must accompany the grid job for a grid provider to execute a grid job. In one example, the client system submits the data to the grid provider with the job to be executed using a tool such as GridFTP, which includes Grid protocol extensions to the file transfer protocol (FTP). In another example, the grid provider accesses the data at a network accessible storage medium using a secure data communication channel, such as secure socket layer (SSL). Either way, the RFP specifies the data access or transport mechanism so that the grid vendor can calculate additional costs associated with the access method selected by the grid client. For example, at reference numeral 816, the data transport specified for RFP 800 is "gridFTP"

As illustrated at reference numeral 836, a data size for data required for a grid job may be specified in RFP 850. For example, at reference numeral 836, the data size specified is 42000 bytes of data. In particular, the data size affects a bid by a grid provider because the data size effects the amount of time required for data access. In addition, larger amounts of data require more storage space, more processing power, and more network bandwidth when the grid provider processes the grid job.

As illustrated at reference numeral 820, security requirements for the hardware, software, and data transport for a grid job may be specified in RFP 850. In particular, some grids jobs must execute in a trusted and secure environment. In the example, the security requirement specified is a "secure data channel" for data transport. In another example, not depicted, data protection tools including, but not limited to, the Grid Security Interface (GSI) and Web Service security (WS-Security) may be specified and platform security requirements including, but not limited to, Trusted Computing Base (TCB) and C2 compliance (C2 security is the U.S. National Security Agency criteria for a secure system), may be specified.

As illustrated at reference numeral 814, the latency requirements of a grid job may be specified in RFP 850. In one example, a latency requirement specifies the amount of time allowed for returning results of a grid job to a user interface. For example, a grid job may require interaction with end users with an expectation of sub-second responses to the user interface.

As illustrated at reference numeral 806, a service level agreement may be specified for a grid job in RFP 850. In particular, the quality of service (QOS) expectations of a grid client for grid jobs are documented in a service level agreement (SLA). As will be understood, a SLA may specify general service expectations for all grid jobs of a grid client or for all grid jobs of a particular type of a grid client. In one example, a grid client formulates all the service expectations in an SLA. In another embodiment, a grid vendor may specify some or all of the service expectations in an SLA. Further, a grid provider or group of grid providers may agree to the SLA for grid jobs submitted by a particular grid client or group of grid clients. In the example, RFP 850 does not include a specified SLA, as indicated at reference numeral 806. In alternate embodiments, however, a SLA may be attached to RFP 850 or referenced by a document number or other form name.

As illustrated at reference numeral 838, an estimated runtime for a job may be specified in RFP 850. In particular, the grid client may have estimates of the estimated job runtime based on previous executions of the same or similar jobs, which are specified in RFP 850 as indicated at reference numeral 838. Even if grid client does not have estimates of a job runtime, an expected job runtime may be designated so that the grid vendor may more accurately estimate the workload expectations for a grid job.

As illustrated at reference numeral 834, a sell-off policy for the grid job may be specified in RFP 850. In particular, a "sell-off" policy indicates whether the grid job can be sold by the winning grid vendor to another grid vendor. In the example, as depicted at reference numeral 834, "sell-off" is not permitted.

As illustrated at reference numeral 840, an RFP response time for responding to the RFP may be specified in RFP 850. In particular, the grid client may specify the deadline for grid providers to return bid responses to the RFP. The deadline may include additional time for negotiation and resubmission or may require a quick spot market price for more urgent jobs. In the example, as depicted at reference numeral 840, the RFP response time is less than or equal to two hours. It will be understood that response times may be specified by a particular time limit, formula, or conditional time limits.

As illustrated at reference numeral 824, a job priority for a particular grid job may be specified in RFP 850. In particular, a user may specify a job priority for each grid job when the grid client is planning to submit multiple jobs simultaneously. The job priority would indicate the priority of each grid job. The grid provider may use the job priority indicator, such as the job priority of "1", as indicated at reference numeral 824, to determine an order to execute grid jobs when grid resources are insufficient or other condition occurs where job priority affects job performance.

As illustrated at reference numeral 842, RFP 850 may include a sample job, here referred to as "microcosm A". A grid provider receiving RFP 850 with a sample job may decide to run the grid job in the grid environment and retrieve a result, to determine the actual workload requirements for the sample job, the actual cost, and the actual performance of the grid environment in processing the grid job. In one example, the sample job may also indicate the size of the sample job in comparison the size of the grid job described by RFP 850, such that the grid provider can estimate total workload, cost, and performance based on the estimated percentage of the total that the sample job represents.

With reference now to FIG. 9, there is depicted a block diagram of one embodiment of a bid controller in accordance with the method, system, and program of the present invention. As depicted, bid controller 412 includes a job request parser 910. RFP parser 910 receives each virtual job request in the form of an RFP and may hold the RFP in a queue until processing can be performed. In addition, RFP parser 910 may translate values specified by a user in the virtual job request into a unit specified for use in workload calculations.

Bid controller 412 may access a resource database 912 includes a listing of each resource available within the grid environment of a grid provider. In particular, for each resource listing, resource database 912 may further specify the type of resource, which clients have access to the resource, the resource performance specifications, and the resource platform characteristics. In addition, resource database 912 may include a listing of resources available to the grid environment of a grid provider from outside the grid environment.

An available resource selector 904 may filter through the available resource database 912 to determine which resources are available as required by an RFP and whether sufficient resources are available as required by the RFP. Alternatively, resource selector 904 may query a management module which manages the available resources for a grid provider.

In particular, resource selector 904 determines whether the resources required for the grid hardware platform specified in the RFP is available. If the specified grid hardware platform is not available, then resource selector 904 determines whether the RFP allows sell-off. If the RFP allows sell-off, then resource selector 904 continues to determine whether the other RFP criteria can be met by the grid vendor, with a sell-off of the grid job to access a hardware platform from another grid vendor. If the RFP does not allow sell-off, then resource selector 904 may return a no bid for the RFP.

Continuing, resource selector 904 determines whether the resources required for the grid software platform specified in the RFP is available. If the software platform is available, then resource selector 904 continues to determine whether the other RFP criteria can be met by the grid vendor. Otherwise, if the grid software platform specified in the RFP is not available, then resource selector 904 may check whether other grid environments or on demand software resource providers are available to provide the software platform if allowed by the RFP or return a no bid for the RFP.

Resource selector 904 also determines whether there are sufficient resources available for the required data access or transport mechanism for the data size with the security required. If there are not sufficient resources for the required bandwidth, resource selector 904 may check other grids for the required bandwidth if allowed by the RFP or return a no-bid.

Based on the available resources for the hardware platform, software platform, and data access required, a workload calculator module next calculates a load factor for the bid request. A total workload calculator 908 may calculate a total workload required for the job specified by the virtual job request. In particular, total workload calculator 908 may determine a total resource requirement and time requirement for an RFP. As will be further described with reference to FIG. 10, the total resource requirement may specify the total amount of hardware, software, or network resources, for example, needed for completion of a job. The total time requirement may specify the time available for executing the job within the grid environment, the time available for accessing data required for the job, and the time available for returning a result of the job from the grid environment to a client system, for example. In addition, total workload calculator 908 may determine other parameters that describe the total workload from additional values specified in a virtual job request.

A capacity calculator 902 compares the total workload required for a virtual job request with the resources available for the virtual job request and determines the capacity of the grid environment to handle the job specified by the virtual job request. In particular, capacity calculator 902 may determine whether the grid environment can meet the resource and latency requirements. If the resource and latency requirements of the virtual job request can be met within the grid environment, then capacity controller 902 determines a total workload factor that can be used by a cost calculator to determine a cost for workload requirement. The workload factor may also indicate the estimated performance available for the job.

The cost calculator 914 calculates a total cost based on workload factor, as limited by the the cost limits specified in the RFP. In addition, the total cost is affected by special pricing specified in the RFP, available for use of off-peak times, or agreed to as part of a grid alliance. In one example, U.S. patent application Ser. No. 11/031,489, filed Jan. 06, 2005, hereby incorporated herein by reference, describes cost calculator 914.

A bid formalizer 906 formalizes retrieves the workload factor, cost, and performs additional comparisons of an RFP to the availability of a grid provider to formalize a bid response to the grid client. In some cases, if the grid environment cannot meet the specific requirements of the virtual job request, but could meet a selection of the virtual job request requirements, then the estimated performance available may indicate the deviation from the virtual job request requirements. For example, if the RFP does not allow CUOD eligibility, but use of CUOD resources would allow the grid vendor to meet other performance requirements for the grid job, then the bid response may include an exception to the CUOD requirement. In another example, if the RFP specifies a price limit that is not met by the cost calculation, then the bid response may include an exception to the price limit.

In addition, bid controller 412 may include a sample controller 920 that controls the performance of grid microcosms received as a sample attachment to an RFP. As previously described with reference to FIG. 6, a grid provider may process a grid microcosm and return the results to the client, such that the client may then compare the relative costs of grid providers. According to another advantage, sample controller 920 processes sample grid microcosms received with an RFP, as described with reference to FIG. 5, and forwards the actual workload use to resource selector 904, the actual workload to workload calculator 908 and capacity calculator 902, and the actual cost to cost calculator 914. Based on the actual resource usage from processing a sample of a grid job that represents a particular percentage of a total grid job, resource selector 904 selects available resources for a total grid job, workload calculator 908 and capacity calculator 902 calculate the load factor for the total grid job, and cost calculator 914 calculate the total cost for the total grid job using actual metrics measured for a sample of the grid job.

Figure 10:
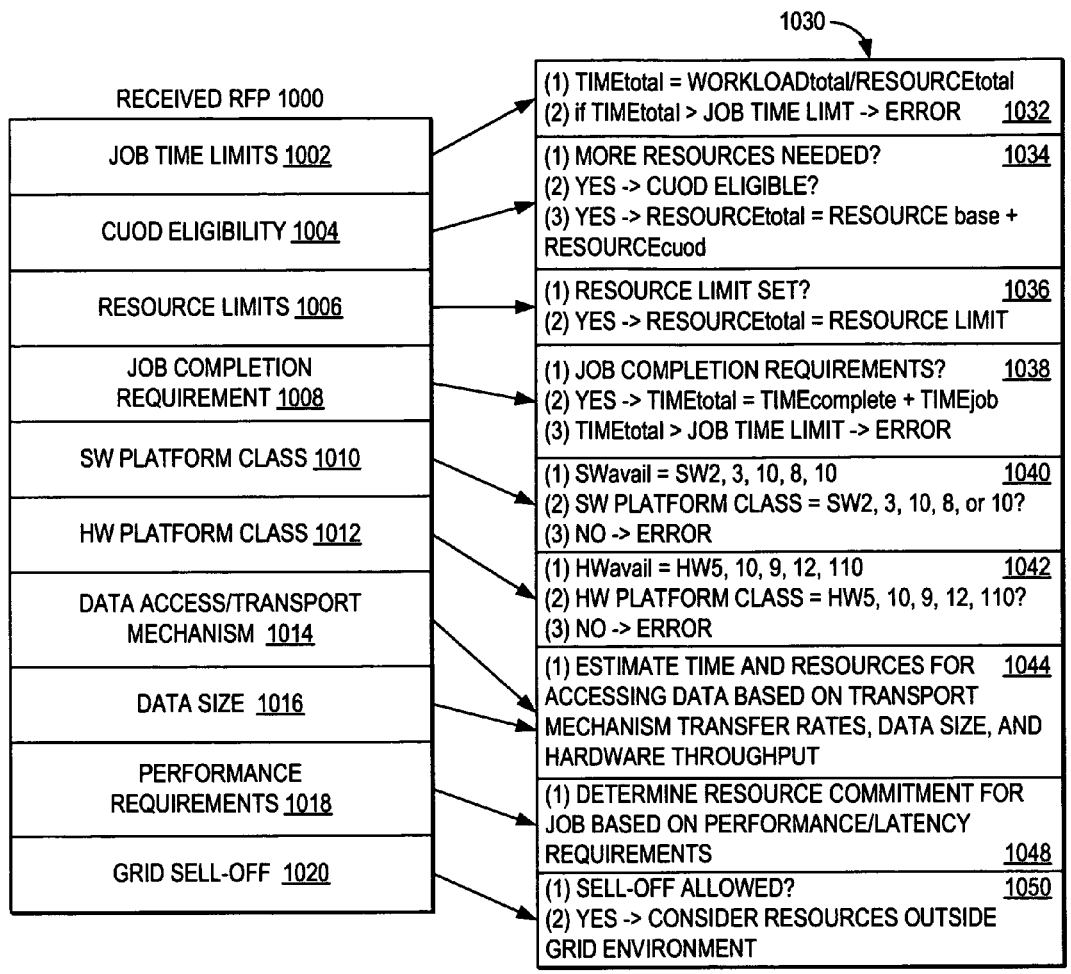
FIG. 10 is an illustrative example depicting calculations performed within the resource selector and workload calculator based on a virtual job request.

With reference now to FIG. 10, there is depicted an illustrative example of calculations performed within the resource selector and workload calculator based on a virtual job request in accordance with the method, system, and program of the present invention. As depicted, a received RFP 1000 includes multiple criteria designated for specifying the performance requirements for completing a grid job associated with the virtual job request. A table indicated at reference numeral 1030 includes multiple entries that describe calculations that resource selector 904 and workload calculator 908 may perform based on the values in received RFP 1000. It is important to note that while the following description broadly references steps performed by workload calculator 908, the sub-calculators within the workload calculator may actually perform one or more of the calculations and evaluations described. Further, it will be understood that the values depicted in received RFP 1000 are illustrative of the types of values that may be included in a virtual job request for enabling bid controller 412 to automatically determine the workload and cost associated with performing a requested job. In addition, it will be understood that the functions depicted in the table indicated at reference numeral 1030 are merely illustrative examples of the types of functions that may be performed by resource selector 904 and workload calculator 908.

As illustrated at reference numeral 1002, a "job time limit" may be specified that indicates the total time for completion of a job or a specific time by which a job must be completed, for example. The workload calculator may use the "job time limit" to determine whether or not the grid environment has the capacity, in the form of the necessary quantity and type of resources needed, to execute the job in the time specified in the "job time limit." In particular, as indicated in table 1030, the workload calculator may first estimate the total time required to perform the job within the grid environment (TIMEtotal) and then compare that estimated total time with the "job time limit" specified at reference numeral 1002. In estimating the total time required to perform the job within the grid environment, the total workload (WORKLOADtotal) required may first be calculated. Then, to calculate the total time required to perform the job, the total workload required may be divided by the total resources (RESOURCEtotal) available to handle the workload. If the total time required for performance of the job is greater than or equal to the "job time limit" than an error is returned indicating that the job cannot be processed within the "job time limit." It is important to note that the total resources available may be constrained by other settings in received RFP 1000, such as whether capacity on demand resources may be used or whether resource limits within the grid environment are imposed.

As depicted at reference numeral 1004, a "capacity on demand (CUOD) eligibility" may be specified indicates whether CUOD resources available to the grid environment can be accessed to perform the job. Further, the CUOD eligibility may specify a limit and type of CUOD resources eligible to execute the job. The workload calculator may check the "CUOD eligibility" if the workload calculator determines that the current grid capacity is not sufficient to run the job and in determining the resources available for the virtual job request. In one example, as depicted at reference numeral 1032, if the workload calculator determines that more resources are needed to perform the job, then the workload calculator looks to see if CUOD eligibility is set to "yes" and if so, adds the available CUOD resources (RESOURCEcuod) to the grid resources (RESOURCEbase) to calculate the total available resources to perform the job (RESOURCEtotal).

As illustrated at reference numeral 1006, a "resource limit" may specify whether there is a limit on the available resources that can be used to perform a job. The workload calculator may check the "resource limit" value to set the total resources available for handling a job. In particular, as depicted at reference numeral 1034, if "resource limit" is set, then the total resources available (RESOURCEtotal) is set to the "resource limit".

As illustrated at reference numeral 1008, a "job completion requirement" value may be specified that indicates additional requirements for completing a job. For example, if a job is for a database and completion of the job requires output in the form of a new data mart transferred to a client system, then the "job completion requirements" may specify the time required for return of the data mart to the client system. Thus, as illustrated at reference numeral 1036, the workload calculator may use the "job completion requirements" (TIMEcomplete) of additional time requirements, storage requirements, processing requirements, and network bandwidth requirements to specify the total time (TIMEtotal) required to complete a job in addition to the time calculated to complete the job itself within the grid environment (TIMEjob). Further, the workload calculator may return an error if the total time required for completion of the job is greater than the time limit.

As depicted at reference numeral 1010, a "software platform class" may specify the software platform class of a job. In one example, software platform classes may be specified by defined numbers. For example, an interactive software class may be specified as SW2 and a web hosting application may be specified as SW3. In general, the workload calculator may use the specified software platform class to determine the likely application characteristics of the job. More specifically, as depicted at reference numeral 1040, the resource selector and workload calculator may use the defined software platform class to determine whether the grid environment has hardware to support the software class. In particular, it is important for the workload calculator to determine whether the job is a batch or interactive because various hardware platforms vary in suitability for software platform types. For example, a zSeries processor may be more efficient for interactive jobs, whereas a pSeries processor may be more efficient for web hosting applications. (zSeries and pSeries are registered trademarks of International Business Machines Corporation).

As illustrated at reference numeral 1012, a "hardware platform class" may specify the hardware platform class of a job. In one example, hardware platform classes may be specified by defined numbers. In general, the workload calculator may use the hardware platform class value to determine which grid hardware is available for the job and the throughput characteristics of the hardware type required for the job. More specifically, as depicted at reference numeral 1042, the resource selector and workload calculator may use the defined hardware platform class to determine whether the preferred hardware platform class is available in the grid environment. If a hardware platform class is not specified at reference numeral 1012, then the workload calculation module may attempt to select the most efficient hardware class based on other specified job characteristics. For example, if a database application is run for a job, and the grid contains preconfigured pSeries 650 nodes running the database application, then the pSeries 650 nodes would be the preferred hardware.

As depicted at reference numeral 1014, a "data access and transport mechanism" value may specify the movement of or access to data that is required for a job. The resource selector and workload calculator may use the "data access and transport mechanism" value with the data size to determine the time and resources associated with any necessary movement of or access to data. For example, as depicted at reference numeral 1044, the RFP may specify in the "data access and transport mechanism" that the grid manager acquire data from the client using the GridFTP application. The resource selector and workload calculator then evaluates the time and resources required to acquire data from the client using the GridFTP application, taking into account the application transfer rates in conjunction with the data size and hardware throughput.

As illustrated at reference numeral 1016, a "data size" may be specified for a job. The resource selector and workload calculator may use the data size in calculating the resources required and time required for the data access specified at reference numeral 1014, as described in the example depicted at reference numeral 1044. In one example, if no value is specified for the "data size" then the workload calculator may assume that no data transfer is required for the execution of the job.

As depicted at reference numeral 1018, a "performance and latency requirement" may be specified that indicates the performance and latency requirements for a job. As depicted at reference numeral 1048, the workload calculator may use the "performance and latency requirement", along with other values, to determine the resource commitment required for a job. For example, a job with no specific performance requirements may require fewer resources, in quantity and relative power, than an interactive job requiring a response to users in under a second. In another example, if a latency value is specified at reference numeral 618, then the latency value is compared with specifications of the hardware platform available within the grid environment. More specifically, industry standards such as Standard Performance Evaluation Corporation Integer (SPECint) or SPEC floating point (SPECfp) can be compared with the latency value, or calculations could be made based on other combined RFP submission data such as hardware platform class or job completion limits.

In addition, as depicted at reference numeral 1020, a "grid sell-off" indicator may be specified to indicate whether the resource selector and workload calculator can consider use of resources outside the grid environment to meet the requirements for the job, as depicted at reference numeral 1050. In one example, if a client does wants a single grid resource vendor to be responsible for data security and job results, the client may not enable a grid sell-off.

With reference now to FIG. 11, a block diagram illustrates an RFP response generated by a grid provider in response to an RFP. As illustrated, an automated RFP response 1100 includes an indication of a grid provider's ability and agreement to handle a grid job described by an RFP. In particular, as illustrated at reference numeral 1102, RFP response 1100 includes the name of the respondent grid provider, where in the example the respondent is "IBM Grid". In addition, as illustrated at reference numeral 1104, RFP response 1100 includes the job number, as specified in the RFP. Next, as depicted at reference numeral 1106, RFP response 1100 includes the estimated runtime of 4.6 hours and at reference numeral 1108 the estimated job cost of $4600.00. Additionally, the grid provider may specify an expiration date and time for RFP response 1100, as illustrated at reference numeral 1110.

In addition, as previously described, an RFP response may include exceptions to the RFP criteria. In the example, as illustrated at reference numeral 1112, RFP response 1100 includes the exception of an actual latency (LATENCYAC-TUAL) that is greater than the latency limit (LATEN-CYLIMIT). Further, RFP response 1100 includes comments, as illustrated at reference numeral 1114, that indicate additional negotiation points and recommendations for a grid client to adjust an RFP during a re-negotiation process.

According to an advantage, bid formalizer 906 may formalize a bid response, such as RFP response 1100 with only the minimal information required for a grid provider to respond to an RFP. In particular, it is advantageous for bid formalizer 906 to avoid needing to include a response to each criteria of an RFP. Further, in particular, it is advantageous for bid formalizer 906 to minimize the information in RFP response 1100 to reduce data flow required from a grid provider and to minimize the data flow in to a grid client. In one example of response minimization, if an RFP specifies that sell-off is not permitted, then the RFP response need not indicate that the grid provider would not sell-off the grid job, however the RFP response may include an exception requiring sell-off or a comment suggestion enabling sell-off eligibility as a way to increase performance or decrease cost for a grid job.

It is important to note that when a user includes a sample of the grid job with an RFP, the response to the RFP may need to indicate whether the grid provider actually ran the sample to calculate the price and performance in the response or whether the price and performance are based on estimations. In addition, it is important to note that when a user includes a sample of a grid job, a grid provider may return a response include the sample results.

Figure 12:
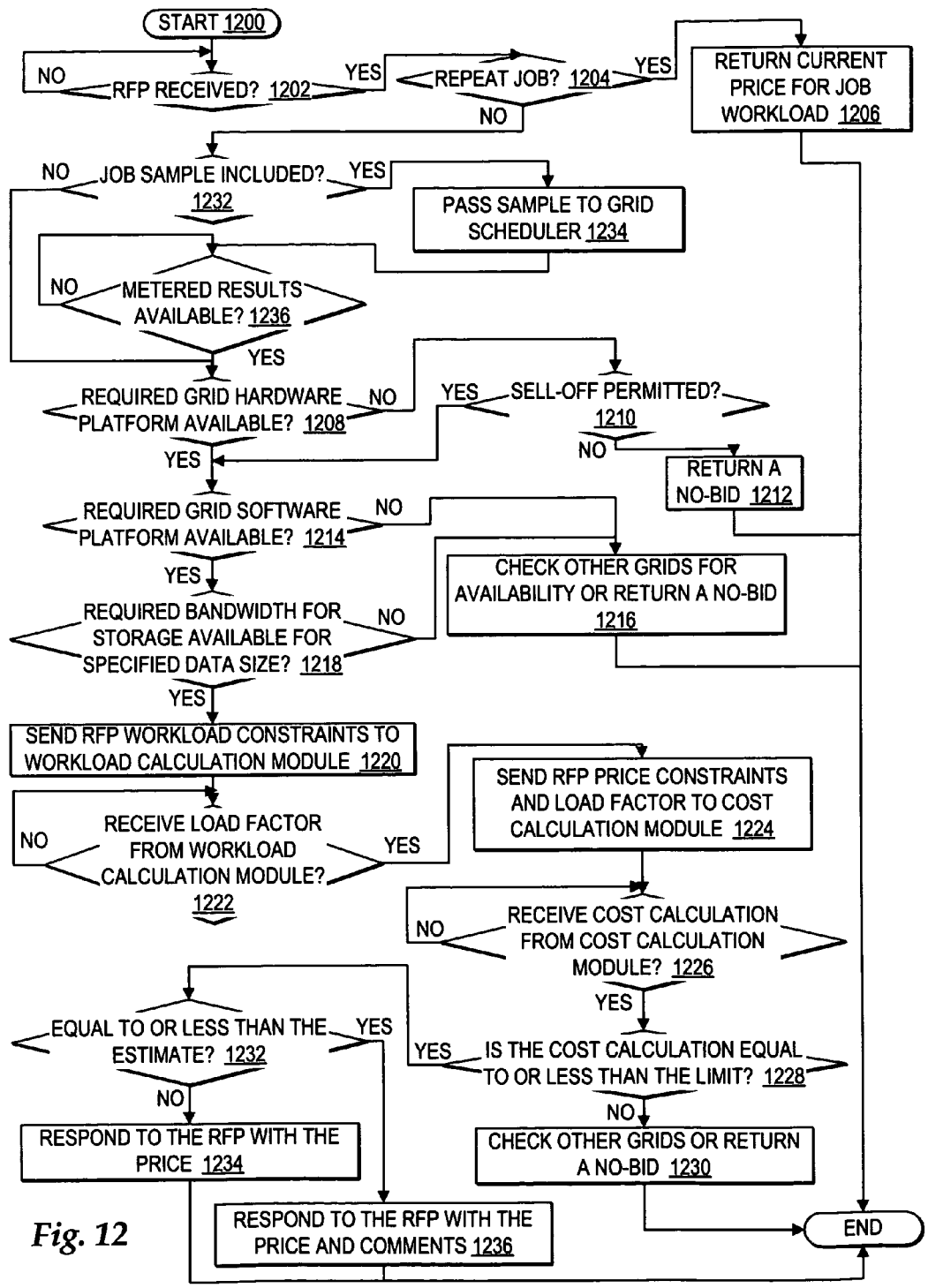
FIG. 12 is a high level logic flowchart illustrating a process and program for managing responses to RFP requests in a grid environment.

Referring now to FIG. 12, there is illustrated a high level logic flowchart of a process and program for managing responses to RFP requests in a grid environment. As depicted, the process performed by a bid controller for a grid provider starts at block 1200 and thereafter proceeds to block 1202. Block 1202 depicts a determination by the bid controller as to whether an RFP is received. If an RFP is not received, then the process iterates at block 1202. If a virtual RFP is received, then the process passes to block 1204.

Block 1204 depicts a determination by the bid controller as to whether the job is a repeat of a previously submitted job. If the job is a repeat of a previously submitted job, then the process passes to block 1206. Block 1206 depicts returning the current price for the job workload, based on the previously determined price for the job workload, and the process ends. Alternatively, at block 1204, if the job is not a repeat of a previously submitted job, then the process passes to block 1232.

Block 1232 depicts a determination whether a job sample, such as a microcosm, is included with an RFP. If a job sample is included, then the process passes to block 1234. Block 1234 depicts passing the job sample to the grid scheduler to execute the job sample. Next, block 1236 depicts a determination whether the metered results for the job sample are available. Once the metered results for the job sample are available, then the process passes to block 1208. In particular, the metered results may include actual workload, actual cost, and actual performance of the job sample within the grid environment for the grid provider. In particular, where the sample represents a percentage of a total grid job, the metered results are accessed during the other steps of the process to calculate cost and performance based on the actual metered results of processing a sample of the grid job.

Block 1208 depicts a determination by the bid controller as to whether the required grid hardware platform is available. If the required grid hardware platform is available, then the process passes to block 1214. Otherwise, if the required grid hardware platform is not available, then the process passes to block 1210. Block 1210 depicts a determination by the bid controller whether a sell-off is permitted. If a sell-off is not permitted, then the process passes to block 1212. Block 1212 depicts the bid controller returning a no-bid, and the process ends. In particular, a no-bid may identify the grid provider, the job number and a non-acceptable indicator. Alternatively, at block 1210, if a sell-off is not permitted, then the process passes to block 1214.

Block 1214 depicts a determination by the bid controller whether the required grid software platform is available. If the required software platform is not available, then the process passes to block 1216. Block 1216 depicts the bid controller checking the other grid providers for software platform availability or returning a no-bid, and the process ends. In one example, the bid controller may only check the other grid providers for software platform availability if the RFP allows sell-off. Otherwise, at block 1214, if the required grid software platform is available, then the process passes to block 1218.

Block 1218 depicts a determination by the bid controller whether the required bandwidth for storage for the specified data size is available. If the required bandwidth is not available, then the process passes to block 1216. If the required bandwidth is available, then the process passes to block 1220.

Block 1220 depicts the bid controller sending the RFP workload constraints to the workload calculation module. In one example, the RFP workload constraints include the CUOD eligibility, job time limits, job resource limits, performance required, latency required, data size, and data transport required. Next, block 1222 depicts a determination by the bid controller whether the load factor is received from the workload calculation module. If the load factor is not yet received, then the process iterates at block 1222. When the load factor is received, then the process passes to block 1224. In particular, a load factor may include the amount of resources required for a job, the time period that grid resources will be used, the type of calculations that will be required to be performed by grid resources, and other indicators of the load that a grid job would have on grid resources, according to the metric unit used by the grid provider for estimating resource usage. In particular, a grid provider may define a custom formula for calculating a load factor that takes into account hourly usage, resources dedicated to a grid job, data accesses, and other requirements of a grid job.

Block 1224 depicts the bid controller sending the RFP pricing constraints and load factor to the cost calculation module. In one example, the RFP pricing constraints include the cost limits, special pricing, and grid alliances. Block 1226 depicts a determination by the bid controller whether the cost calculation is received. If the cost calculation is not yet received, then the process iterates at block 1226. If the cost calculation is received, then the process passes to block 1228. In particular, the cost calculation module calculates the cost for the load factor, as adjusted by any special pricing for grid alliances or bulk grid job submissions. In particular, a grid provider may maintain cost metrics that enable the cost calculation module to adjust a cost for a particular load factor based on the time of day, the type of grid job, the identity of the grid client, and other factors that influence cost.

Block 1228 depicts a determination by the bid controller whether the cost calculation is equal to or less than the cost limit specified in the RFP. If the cost calculation is not equal to or less than the limit, then the process passes to block 1230. Block 1230 depicts the bid controller checking other grids, if the RFP allows sell-off, or returning a no-bid and the process ends. Alternatively, at block 1228, if the cost calculation is equal to or less than the limit, then the process passes to block 1232.

Block 1232 depicts a determination by the bid controller whether the cost calculation is equal to or less than the estimate. If the cost calculation is not equal to or less than the estimate, then the process passes to block 1234. Block 1234 depicts the bid controller responding to the RFP with the price, and the process ends. Alternatively, at block 1232, if the cost calculation is not equal to or less than the estimate, then the process passes to block 1236. Block 1236 depicts the bid controller responding to the RFP with the price and comments suggesting adjustments to the RFP to achieve the cost limit or exceptions to the RFP that would enable the grid provider to meet the cost limit, and the process ends.

Figure 13:
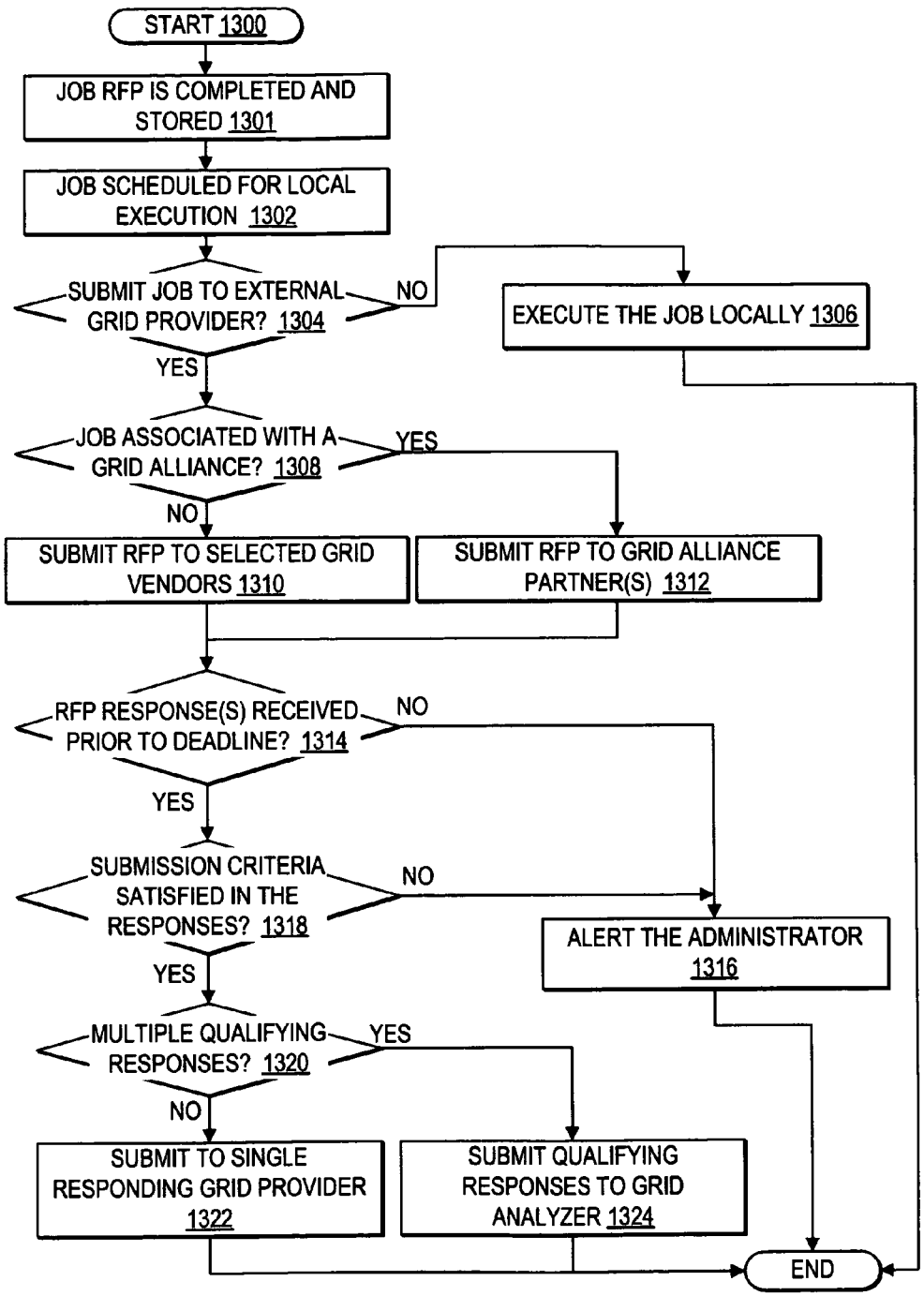
FIG. 13 is a high level logic flowchart illustrating a process and program for controlling submission of an RFP to grid providers and processing bid responses.

Referring now to FIG. 13, a high level logic flowchart depicts a process and program for controlling submission of an RFP to grid providers and processing bid responses in accordance with a method, system, and program of the present invention. As illustrated, the process performed by a grid client agent starts at block 1300 and thereafter proceeds to block 1301. Block 1301 depicts completing and storing a grid job RFP, and the process passes to block 1302. In particular, as previously described, the RFP specification controller may trigger a user to complete and store an RFP responsive to the job qualifying for the cost associated with grid submission.

Next, block 1302 depicts scheduling the job for local execution. Thereafter, block 1304 illustrates a determination whether to submit the job to an external grid provider. If a determination is made not to submit the job to the external grid provider, then the process passes to block 1306. Block 1306 depicts executing the job in a local grid or set of resources, and the process ends.

Returning block 1304, if a determination is made to submit the job to the external grid provider, then the process passes to block 1308. Block 1308 illustrates a determination whether the job is associated with a grid alliance. If the job is associated with a grid alliance, then the process passes to block 1312. Block 1312 depicts submitting the RFP to grid alliance partners, and the process passes to block 1314. Otherwise, at block 1308, if the job is not associated with a grid alliance, then the process passes to block 1310. Block 1310 depicts submitting the RFP to selected grid vendors as specified in the RFP or selected based on grid provider ratings, and the process passes to block 1314.

Block 1314 depicts a determination whether RFP responses are received prior to a deadline. If RFP responses are not received prior to a deadline, then the process passes to block 1316. Block 1316 illustrates alerting an administrator to the lack of responses received, and the process ends. Otherwise, at block 1314, if RFP responses are received prior to the deadline, then the process passes to block 1318.

Block 1318 depicts a determination whether the submission criteria is satisfied in the responses. If the submission criteria are not satisfied in the responses, then the process passes to block 1316, and the administrator is alerted to the disparity between submission criteria and responses, and the process ends. Alternatively, the RFP exception manager may attempt to renegotiate the RFPs with the grid providers with the exceptions or comments included in the responses. Otherwise, at block 1318, if the submission criteria are satisfied in the responses, then the process passes to block 1320.

Block 1320 depicts a determination whether multiple responses are available in which the submission criteria is satisfied. If multiple responses are not available, then the process passes to block 1322. Block 1322 depicts submitting the job to the single grid provider with the response in which the submission criteria are satisfied, and the process ends. If multiple responses are available, then the process passes to block 1324. Block 1324 depicts submitting the multiple available responses to the grid analyzer for analysis, as described with reference to FIG. 14, and the process ends.

Figure 14:
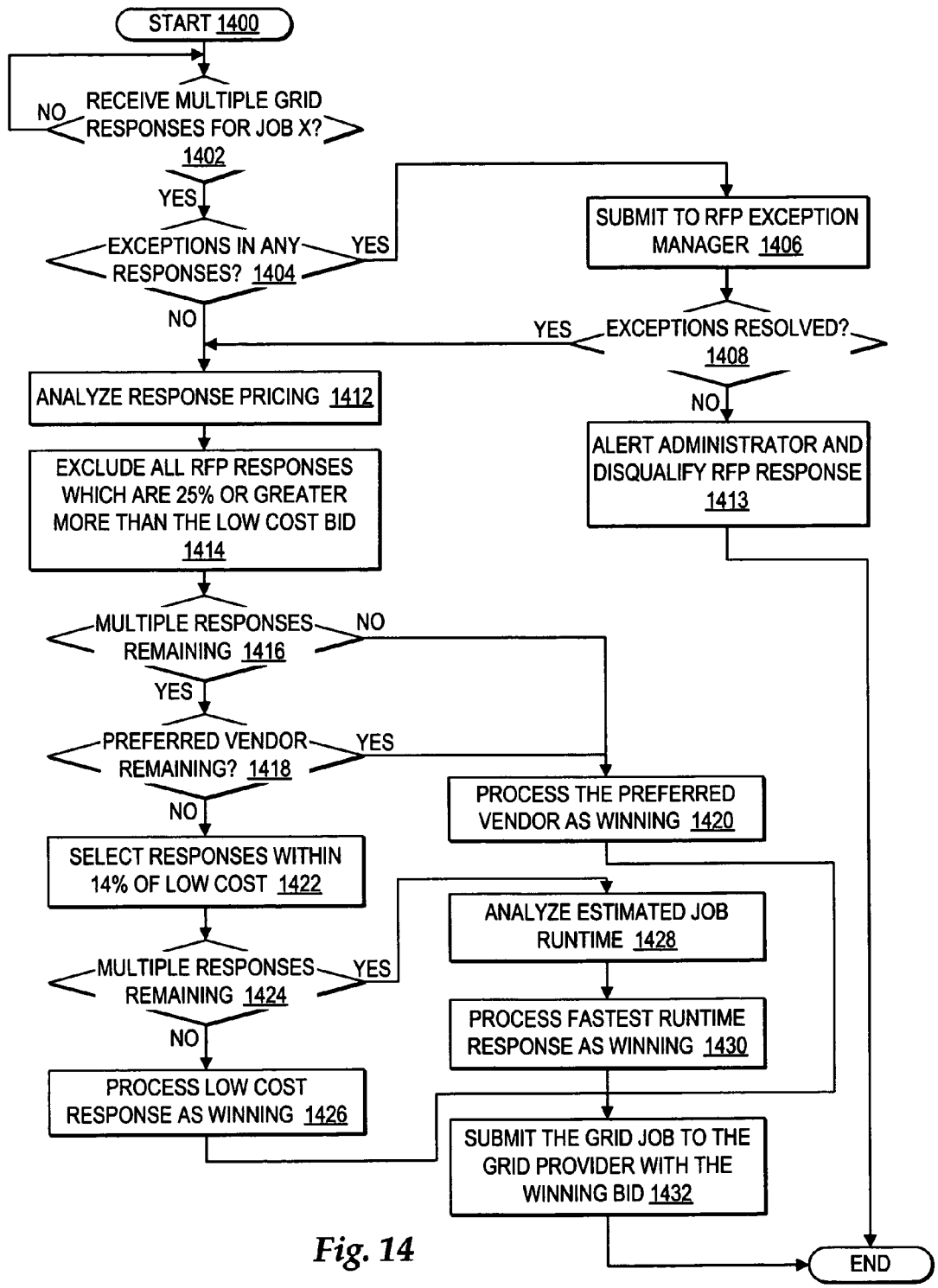
FIG. 14 is a high level logic flowchart illustrating a process and program for analyzing bids received from multiple grid providers at a grid client system.

With reference now to FIG. 14, there is depicted a high level logic flowchart of a process and program for analyzing bids. As depicted, the process performed by a response analyzer for a grid client starts at block 1400 and thereafter proceeds to block 1402. Block 1402 depicts a determination whether multiple grid RFP responses are received for job X. If multiple responses are not received, then the process iterates at block 1402. If multiple responses are received, then the process passes to block 1404. In particular, in one example, the process described by FIG. 14 is invoked by the process of FIG. 13 determining that multiple RFP responses are received that meet submission criteria.

Block 1404 depicts a determination whether there are any exceptions in the responses. If there are not exceptions, then the process passes to block 1412. If there are exceptions, then the process passes to block 1406. Block 1406 depicts submitting the exception to the RFP exception manager. Next, block 1408 depicts a determination whether the exception is resolved. If the exception is resolved, then the process passes to block 1412. If the exception is not resolved, then the process passes to block 1414. Block 1414 depicts alerting the administrator and disqualifying the RFP response with the exception, and the process ends.

Block 1412 depicts analyzing the response pricing. Next, block 1414 depicts excluding all RFP responses which are 25% or greater more than the low cost bid, and the process passes to block 1416. It will be understood that the percentage of 25%, and other percentages used to reduce the number of eligible responses are merely examples and may vary from grid client to grid client.

Block 1416 depicts a determination whether there are multiple RFP responses remaining. If there are not multiple responses remaining, then the process passes to block 1420. Block 1420 depicts processing the preferred vendor as the winning response, and the process passes to block 1432. Block 1432 depicts submitting the job to the grid provider with the winning response, and the process ends. Otherwise, at block 1416, if there are multiple RFP responses remaining, then the process passes to block 1418. Block 1418 depicts a determination whether there is a preferred vendor remaining. If there is a preferred vendor remaining, then the process passes to block 1420. If there is not a preferred vendor remaining, then the process passes to block 1422.

Block 1422 depicts selecting responses within 14% of the low cost bid. Next, block 1424 depicts a determination whether there are multiple responses remaining. If there are not multiple responses remaining, then the process passes to block 1426. Block 1426 depicts processing the low cost response as the winning bid, and the process passes to block 1432. Otherwise, at block 1424, if there are multiple responses remaining, then the process passes to block 1428. Block 1428 depicts analyzing the estimated job runtime. Next, block 1430 depicts processing the fastest runtime response as the winning bid, and the process passes to block 1432. It will be understood that in addition to cost and runtime, other factors included in bid responses may be considered and used to select the winning response.

While the invention has been particularly shown and described with reference to a preferred embodiment, it will be understood by those skilled in the art that various changes in form and detail may be made therein without departing from the spirit and scope of the invention.

What is claimed is:

1. A computer-implemented method for automatically responding to a virtual job request from a grid client, comprising:

receiving, from a client system, a job request for processing a job within a grid environment of a grid provider at a grid service via a network, wherein said job request specifies at least one criteria required for said grid provider to handle a particular grid job;

processing, at said grid service executing within said grid environment, said at least one criteria of said job request to determine whether said grid environment comprises a hardware platform class, a software platform class, and a network bandwidth required by said job request;

responsive to determining that said grid environment comprises said hardware platform class, said software platform class, and said network bandwidth required by said job request, calculating a total required workload for said job request;

calculating a total cost for said total required workload for said job request by determining whether said job request describes a type of job request pre-approved for a discount price based on said client system agreeing to submit said type of job request solely to at least one grid provider specified in a grid alliance; and automatically returning, to said client system, a response to said job request comprising an identifier for said grid provider and said total cost for said job request, such that said client system is enabled to determine whether to submit said particular grid job to said grid provider.

2. The computer-implemented method according to claim 1 for automatically responding to a job request from a grid client, wherein calculating a total required workload for said job request further comprises:

only allowing said total required workload to comprise on demand resources and external grid provider resources if allowed by said job request.

3. The computer-implemented method according to claim 1 for automatically responding to a job request from a grid client, wherein calculating a total required workload for said job request further comprises:

calculating a total time available for at least one from among executing said job within said grid environment, accessing data required for said job, and returning a result of said job from said grid environment to said client system based on said at least one criteria in said job request;

calculating a total resource requirement for processing said job from at least one from among a hardware resource, a software resource, and a network resource based on said at least one criteria in said job request; and determining a selection of available resources from among a plurality of available resources in said grid environment enabling said grid provider to process said particular grid job in said total time available and with said total resource requirement.

4. The computer-implemented method according to claim 1 for automatically responding to a job request from a grid client, wherein automatically returning, to said client system, a response to said job request comprising an identifier for said grid provider and said total cost for said job request, further comprises:

selecting at least one exception to said at least one criteria in said job request; and returning said response with said at least one exception, wherein said client system is enabled to renegotiate with said grid provider via said grid service based on an adjusted job request with said at least one criteria adjusted based on said at least one exception.

5. The computer-implemented method according to claim 1 for automatically responding to a job request from a grid client, wherein automatically returning, to said client system, a response to said job request comprising an identifier for said grid provider and said total cost for said job request, further comprises:

detecting a potential adjustment to said job request to facilitate a lower cost for said particular grid job according to pricing constraints for said grid provider; and returning said response with said potential adjustment of said job request, wherein said client system is enabled to renegotiate with said grid provider via said grid service based on an adjusted job requested based on said potential adjustment.

6. The computer-implemented method according to claim 1 for automatically responding to a job request from a grid client, further comprising:

responsive to receiving said job request with a sample grid job attachment, passing said sample grid job attachment to a grid scheduler for said grid provider, wherein said sample grid job attachment represents a percentage sample of said particular grid job, wherein said grid scheduler schedules resources within said grid environment for processing said sample grid job attachment, wherein said grid provider meters an actual usage of resources by said sample grid job, an actual cost of said sample grid job, and an actual performance of said sample grid job; and calculating said total required workload for said job request and said total cost for said job request based on said actual usage of resources, said actual cost, and said actual performance based on said percentage sample of said particular grid job.

* * * * *